(12) United States Patent
Choi et al.

(10) Patent No.: US 11,149,216 B2
(45) Date of Patent: Oct. 19, 2021

(54) INTEGRATED HYDROTHERMAL PROCESS TO UPGRADE HEAVY OIL

(71) Applicant: Saudi Arabian Oil Company, Dhahran (SA)

(72) Inventors: Ki-Hyouk Choi, Dhahran (SA); Mazin M. Fathi, Dhahran (SA); Bader M. Alotaibi, Dhahran (SA); Ali S. Al-Nasir, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/928,212

(22) Filed: Jul. 14, 2020

(65) Prior Publication Data
US 2020/0339893 A1    Oct. 29, 2020

Related U.S. Application Data

(63) Continuation of application No. 15/914,667, filed on Mar. 7, 2018, now Pat. No. 10,752,847.
(Continued)

(51) Int. Cl.
*C10G 63/04* (2006.01)
*C10G 45/26* (2006.01)
(Continued)

(52) U.S. Cl.
CPC .............. *C10G 63/04* (2013.01); *B01D 3/06* (2013.01); *B01D 3/14* (2013.01); *C01B 3/38* (2013.01);
(Continued)

(58) Field of Classification Search
CPC ........ C10G 63/04; C10G 53/02; C10G 31/08; C10G 47/32; C10G 65/12; C10G 45/26;
(Continued)

(56) References Cited

U.S. PATENT DOCUMENTS 2,733,192 A    1/1956   Sage
2,880,171 A    3/1959   Flinn et al.
(Continued)

FOREIGN PATENT DOCUMENTS

CA    2772095       10/2012
CN    1508221 A     6/2004
(Continued)

OTHER PUBLICATIONS

Notice of Reason for Refusal issued in the prosecution of JP Patent Application No. 2019-540855, dated Oct. 27, 2020, 14 pages.
(Continued)

*Primary Examiner* — Randy Boyer
*Assistant Examiner* — Juan C Valencia
(74) *Attorney, Agent, or Firm* — Bracewell LLP; Constance Gall Rhebergen

(57) ABSTRACT

An integrated hydrothermal process for upgrading heavy oil includes the steps of mixing a heated water stream and a heated feed in a mixer to produce a mixed fluid, introducing the mixed stream to a reactor unit to produce a reactor effluent that includes light fractions, heavy fractions, and water, cooling the reactor effluent in a cooling device to produce a cooled fluid, depressurizing the cooled fluid in a depressurizing device to produce a depressurized fluid, introducing the depressurized fluid to a flash drum configured to separate the depressurized fluid into a light fraction stream and a heavy fraction stream. The light fraction stream includes the light fractions and water and the heavy fraction stream includes the heavy fractions and water. The process further includes the step of introducing the heavy fraction stream to an aqueous reforming unit that includes a catalyst to produce an aqueous reforming outlet.

19 Claims, 9 Drawing Sheets

Related U.S. Application Data

(60) Provisional application No. 62/468,721, filed on Mar. 8, 2017.

(51) Int. Cl.

| | | |
|---|---|---|
| *C10G 7/06* | (2006.01) | |
| *B01D 3/06* | (2006.01) | |
| *B01D 3/14* | (2006.01) | |
| *C10G 53/02* | (2006.01) | |
| *C10G 31/08* | (2006.01) | |
| *C10G 47/32* | (2006.01) | |
| *C10G 65/12* | (2006.01) | |
| *C01B 3/38* | (2006.01) | |

(52) U.S. Cl.
CPC ............. *C10G 7/06* (2013.01); *C10G 31/08* (2013.01); *C10G 45/26* (2013.01); *C10G 47/32* (2013.01); *C10G 53/02* (2013.01); *C10G 65/12* (2013.01); *C01B 2203/0233* (2013.01); *C10G 2300/107* (2013.01); *C10G 2300/1077* (2013.01); *C10G 2300/301* (2013.01); *C10G 2300/308* (2013.01)

(58) Field of Classification Search
CPC ............... C10G 7/06; C10G 2300/301; C10G 2300/107; C10G 2300/1077; C10G 2300/308; C01B 3/38; C01B 2203/0233; B01D 3/06; B01D 3/14; Y02P 20/52
See application file for complete search history.

(56) References Cited

U.S. PATENT DOCUMENTS

| | | |
|---|---|---|
| 2,944,012 A | 7/1960 | Thompson |
| 2,967,204 A | 1/1961 | Beuther et al. |
| 3,116,234 A | 12/1963 | Douwes et al. |
| 3,377,267 A | 4/1968 | Spars |
| 3,501,396 A | 3/1970 | Gatsis |
| 3,576,596 A | 4/1971 | Kranc et al. |
| 3,586,621 A | 6/1971 | Pitchford et al. |
| 3,654,139 A | 4/1972 | Winsor et al. |
| 3,702,292 A | 11/1972 | Burich |
| 3,733,259 A | 5/1973 | Wilson et al. |
| 3,830,752 A | 8/1974 | Mickelson |
| 3,836,594 A | 9/1974 | Sampson |
| 3,842,014 A | 10/1974 | Friend et al. |
| 3,864,451 A | 2/1975 | Lee et al. |
| 3,898,299 A | 8/1975 | Jones |
| 3,948,754 A | 4/1976 | McCollum et al. |
| 3,948,755 A | 4/1976 | McCollum et al. |
| 3,960,706 A | 6/1976 | McCollum et al. |
| 3,960,708 A | 6/1976 | McCollum et al. |
| 3,988,238 A | 10/1976 | McCollum et al. |
| 3,989,618 A | 11/1976 | McCollum et al. |
| 4,005,005 A | 1/1977 | McCollum et al. |
| 4,082,695 A | 4/1978 | Rosinski et al. |
| 4,151,068 A | 4/1979 | McCollum et al. |
| 4,203,829 A | 5/1980 | Bertolacini |
| 4,210,628 A | 7/1980 | Ninomiya et al. |
| 4,325,926 A | 4/1982 | Blanton, Jr. |
| 4,464,252 A | 8/1984 | Eberly, Jr. et al. |
| 4,483,761 A | 11/1984 | Paspek, Jr. |
| 4,485,007 A | 11/1984 | Tam et al. |
| 4,530,755 A | 7/1985 | Ritchie et al. |
| 4,544,481 A | 10/1985 | Seiver et al. |
| 4,594,141 A | 6/1986 | Paspek, Jr. et al. |
| 4,719,000 A | 1/1988 | Beckberger |
| 4,743,357 A | 5/1988 | Patel et al. |
| 4,762,814 A | 8/1988 | Parrott et al. |
| 4,818,370 A | 4/1989 | Gregoli et al. |
| 4,840,725 A | 6/1989 | Paspek |
| 4,908,122 A | 3/1990 | Frame et al. |
| 5,087,350 A | 2/1992 | Paris-Marcano |
| 5,096,567 A | 3/1992 | Paspek et al. |
| 5,167,797 A | 12/1992 | Ou |
| 5,278,138 A | 1/1994 | Ott et al. |
| 5,316,659 A | 5/1994 | Brons et al. |
| 5,411,658 A | 5/1995 | Chawla et al. |
| 5,421,854 A | 6/1995 | Kodas et al. |
| 5,439,502 A | 8/1995 | Kodas et al. |
| 5,466,363 A | 11/1995 | Audeh et al. |
| 5,496,464 A | 3/1996 | Piskorz et al. |
| 5,529,968 A | 6/1996 | Sudhakar et al. |
| 5,538,930 A | 7/1996 | Sudhakar et al. |
| 5,558,783 A | 9/1996 | McGuinness |
| 5,597,476 A | 1/1997 | Hearn et al. |
| 5,611,915 A | 3/1997 | Siskin et al. |
| 5,616,165 A | 4/1997 | Glicksman et al. |
| 5,676,822 A | 10/1997 | Sudhakar |
| 5,695,632 A | 12/1997 | Brons et al. |
| 5,837,640 A | 11/1998 | Sudhakar et al. |
| 5,851,381 A | 12/1998 | Tanaka et al. |
| 5,861,136 A | 1/1999 | Glicksman |
| 5,885,441 A | 3/1999 | Pereira et al. |
| 5,906,730 A | 5/1999 | Hatanaka et al. |
| 5,928,497 A | 7/1999 | Iaccino |
| 5,958,224 A | 9/1999 | Ho et al. |
| 5,990,370 A | 11/1999 | Sims |
| 6,030,522 A | 2/2000 | Pereira et al. |
| 6,063,265 A | 5/2000 | Chiyoda et al. |
| 6,096,194 A | 8/2000 | Tsybulevskiy et al. |
| 6,103,393 A | 8/2000 | Kodas et al. |
| 6,120,679 A | 9/2000 | Hatanaka et al. |
| 6,153,123 A | 11/2000 | Hampden-Smith et al. |
| 6,159,267 A | 12/2000 | Hampden-Smith et al. |
| 6,197,718 B1 | 3/2001 | Brignac et al. |
| 6,228,254 B1 | 5/2001 | Jossens et al. |
| 6,248,230 B1 | 6/2001 | Min et al. |
| 6,277,271 B1 | 8/2001 | Kocal |
| 6,303,020 B1 | 10/2001 | Podrebarac et al. |
| 6,316,100 B1 | 11/2001 | Kodas et al. |
| 6,325,921 B1 | 12/2001 | Andersen |
| 6,334,948 B1 | 1/2002 | Didillon et al. |
| 6,488,840 B1 | 12/2002 | Greaney et al. |
| 6,500,219 B1 | 12/2002 | Gunnerman |
| 6,551,501 B1 | 4/2003 | Whitehurst et al. |
| 6,579,444 B2 | 6/2003 | Feimer et al. |
| 6,596,157 B2 | 7/2003 | Gupta et al. |
| 6,610,197 B2 | 8/2003 | Stuntz et al. |
| 6,623,627 B1 | 9/2003 | Zhou |
| 6,685,762 B1 | 2/2004 | Brewster et al. |
| 6,689,186 B1 | 2/2004 | Hampden-Smith et al. |
| 6,699,304 B1 | 3/2004 | Hampden-Smith et al. |
| 6,780,350 B1 | 8/2004 | Kodas et al. |
| 6,827,845 B2 | 12/2004 | Gong et al. |
| 6,881,325 B2 | 4/2005 | Morris et al. |
| 7,144,498 B2 | 12/2006 | McCall et al. |
| 7,264,710 B2 | 9/2007 | Hokari et al. |
| 7,435,330 B2 | 10/2008 | Hokari et al. |
| 7,731,837 B2 | 6/2010 | Song et al. |
| 7,780,847 B2 | 8/2010 | Choi |
| 7,842,181 B2 | 11/2010 | Choi |
| 8,399,729 B2 | 3/2013 | Davis et al. |
| 8,496,786 B2 | 7/2013 | Larson et al. |
| 8,535,518 B2 | 9/2013 | Choi et al. |
| 8,648,224 B2 | 2/2014 | Vermeiren et al. |
| 8,696,888 B2 | 4/2014 | Keusenkothen et al. |
| 8,784,743 B2 | 7/2014 | Keusenkothen et al. |
| 9,005,432 B2 | 4/2015 | Choi et al. |
| 9,290,706 B2 | 3/2016 | Zhao et al. |
| 9,505,678 B2 | 11/2016 | Choi et al. |
| 9,567,530 B2 | 2/2017 | Choi et al. |
| 9,650,578 B2 | 5/2017 | De Klerk et al. |
| 9,656,230 B2 | 5/2017 | Choi |
| 9,670,419 B2 | 6/2017 | Choi et al. |
| 9,777,566 B2 | 10/2017 | Matzakos |
| 2003/0062163 A1 | 4/2003 | Moulton et al. |
| 2003/0217952 A1 | 11/2003 | Brignac et al. |
| 2004/0007506 A1 | 1/2004 | Song et al. |
| 2004/0024072 A1 | 2/2004 | Lin et al. |
| 2004/0118748 A1 | 6/2004 | Lesemann et al. |
| 2004/0178123 A1 | 9/2004 | Podrebarac |

(56) References Cited

U.S. PATENT DOCUMENTS

| | | |
|---|---|---|
| 2004/0188327 A1 | 9/2004 | Groten |
| 2005/0040078 A1 | 2/2005 | Zinnen et al. |
| 2005/0067323 A1 | 3/2005 | Balko |
| 2005/0072137 A1 | 4/2005 | Hokari et al. |
| 2005/0075528 A1 | 4/2005 | Burkhardt et al. |
| 2005/0098478 A1 | 5/2005 | Gupta et al. |
| 2005/0167333 A1 | 8/2005 | McCall et al. |
| 2005/0173297 A1 | 8/2005 | Toida |
| 2005/0252831 A1 | 11/2005 | Dysard et al. |
| 2005/0284794 A1 | 12/2005 | Davis et al. |
| 2006/0011511 A1 | 1/2006 | Hokari et al. |
| 2006/0043001 A1 | 3/2006 | Weston et al. |
| 2006/0151359 A1 | 7/2006 | Ellis et al. |
| 2006/0154814 A1 | 7/2006 | Zanibelli et al. |
| 2006/0163117 A1 | 7/2006 | Hong |
| 2006/0231455 A1 | 10/2006 | Olsvik et al. |
| 2007/0090021 A1 | 4/2007 | McCall et al. |
| 2007/0111319 A1 | 5/2007 | Bastide et al. |
| 2007/0234640 A1 | 10/2007 | Jia et al. |
| 2008/0099373 A1 | 5/2008 | Hokari et al. |
| 2008/0099374 A1 | 5/2008 | He et al. |
| 2008/0099375 A1 | 5/2008 | Landau et al. |
| 2008/0099376 A1 | 5/2008 | He et al. |
| 2008/0099377 A1 | 5/2008 | He et al. |
| 2009/0032436 A1 | 2/2009 | Takahashi et al. |
| 2009/0145807 A1 | 6/2009 | Choi et al. |
| 2009/0145808 A1 | 6/2009 | Choi et al. |
| 2009/0148374 A1 | 6/2009 | Choi |
| 2009/0166262 A1 | 7/2009 | He et al. |
| 2009/0206006 A1 | 8/2009 | Allam |
| 2009/0230026 A1 | 9/2009 | Choi et al. |
| 2010/0314583 A1 | 12/2010 | Banerjee |
| 2011/0024330 A1 | 2/2011 | Choi |
| 2011/0315600 A1 | 12/2011 | Choi et al. |
| 2012/0061291 A1 | 3/2012 | Choi et al. |
| 2012/0061294 A1* | 3/2012 | Choi ..................... C10G 47/32 208/97 |
| 2013/0180888 A1 | 7/2013 | Corscadden et al. |
| 2013/0233766 A1 | 9/2013 | Shafi et al. |
| 2013/0267745 A1 | 10/2013 | Schrod et al. |
| 2014/0054198 A1 | 2/2014 | Podrebarac |
| 2014/0353138 A1 | 12/2014 | Amale et al. |
| 2015/0090631 A1 | 4/2015 | Joo et al. |
| 2015/0321945 A1 | 11/2015 | Kenji |
| 2015/0321975 A1* | 11/2015 | Choi ........................ C07C 4/04 585/400 |
| 2015/0376512 A1 | 12/2015 | Lourenco et al. |
| 2017/0107433 A1 | 4/2017 | Choi et al. |
| 2017/0166819 A1 | 6/2017 | Choi et al. |
| 2017/0166821 A1 | 6/2017 | Choi et al. |
| 2017/0166824 A1 | 6/2017 | Choi et al. |
| 2018/0265792 A1 | 9/2018 | Choi et al. |

FOREIGN PATENT DOCUMENTS

| | | |
|---|---|---|
| CN | 101553553 A | 10/2009 |
| FR | 2913235 A1 | 9/2008 |
| GB | 1098698 A | 1/1968 |
| JP | 2000282063 A | 10/2000 |
| JP | 2001019984 A | 1/2001 |
| JP | 2001192676 A | 7/2001 |
| JP | 2003049180 A | 2/2003 |
| JP | 2003277770 A | 10/2003 |
| JP | 2005015533 A | 1/2005 |
| JP | 2013540855 A | 11/2013 |
| WO | 9600269 | 1/1996 |
| WO | 9967345 | 12/1999 |
| WO | 0179391 | 10/2001 |
| WO | 02053684 | 7/2002 |
| WO | 2005005582 A1 | 1/2005 |
| WO | 2007015391 A1 | 2/2007 |
| WO | 2009070561 A1 | 6/2009 |
| WO | 2012037011 A1 | 3/2012 |
| WO | 2012143972 A1 | 10/2012 |

OTHER PUBLICATIONS

Skrabalak et al., "Porous MoS2 Synthesized by Ultrasonic Spray Pyrolysis", J. Am. Chem. Soc. 2005, 127, 9990-9991.

State Intellectual Property Office (SIPO) Search Report dated Feb. 25, 2014; Chinese Patent Application No. 201180032487.6; Search Report issued with Office Action in corresponding Chinese Application.

Totten, "Fuels and Lubricants Handbook—Technology, Properties, Performance, and Testing", ASTM International, 2003, pp. 21-30.

Uematsu et al., "New application of spray reaction technique to the preparation of supported gold catalysts for environmental catalysis", Journal of Molecular Catalysis A: Chemical 182-183, pp. 209-214 (2002).

Yazu et al., "Immobilized Tungstophosphoric Acid-catalyzed Oxidative Desulfurization of Diesel Oil with Hydrogen Peroxide", Journal of Japan Petroleum Institute, vol. 46, No. 6 (2003), pp. 379-382.

Yazu et al., "Oxidative Desulfurization of Diesel Oil with Hydrogen Peroxide in the Presence of Acid Catalyst in Diesel Oil/Acetic Acid Biphasic System", Chemistry Letters, vol. 33, No. 10 (2004), pp. 1306-1307.

Zhou et al., "Deep Desulfurization of Diesel Fuels by Selective Adsorption with Activated Carbons", Prepr. Pap._Am. Chem. Soc., Div. Pet, Chem, 2004, 49(3), pp. 329-332.

Amemiya et al., "Catalyst Deactivation in Distillate Hydrotreating (Part 2) Raman Analysis of Carbon Deposited on Hydrotreating Catalyst for Vacuum Gas Oil", Journal of the Japan Petroleum Institute (2003), pp. 99-104, vol. 46, No. 2.

Broach et al., "Zeolites", Ullmann's Encyclopedia of Industrial Chemistry, Apr. 15, 2012, pp. 1-35.

Chica et al., "Catalytic oxidative desulfurization (ODS) of diesel fuel on a continuous fixed-bed reactor", Journal of Catalysis, vol. 242, (2006), pp. 299-308.

Choi et al., "Facile ultra-deep desulfurization of gas oil through two-stage or layer catalyst bed", Catalysis Today (2003), vol. 86, pp. 277-286.

Choi et al., Impact of removal extent of nitrogen species in gas oil on its HDS performance: an efficient approach to its ultra deep desulfurization:, Applied Catalysis B: Environmental (2004), vol. 50, pp. 9-16.

Choi et al., "Preparation and Characterization on nano-sized CoMo/Al2o3 catalyst for hydrodesulfurization", Applied Catalysis A: General 260 (2004) 229-236.

Choi et al., "Preparation of CO2 Absorbent by Spray Pyrolysis", Chemistry Letters, vol. 32, No. 10 (2003), pp. 924-925.

De Filippis et al., "Oxidation Desulfurization: Oxidation Reactivity of Sulfur Compounds in Different Organic Matrixes", Energy & Fuels, vol. 17, No. 6 (2003), pp. 1452-1455.

Farag et al., "Carbon versus alumina as a support for Co—Mo catalysts reactivity towards HDS of dibenzothiophenes and diesel fuel", Catalysis Today 50 (1999) 9-17.

Fathi, et al., "Catalytic Aquaproessing of Arab Light Vacuum Residue via Short Space Times", Energy & Fuels, 25, 4867-4877(2011).

Furimsky et al., "Deactivation of hydroprocessing catalyst", Catalysis Today (1999), pp. 381-495, vol. 52.

Gao et al., "Adsorption and reduction of NO2 over activated carbon at low temperature", Fuel Processing Technology 92, 2011, pp. 139-146, Elsevier B.V.

Gray, et al., "Role of Chain Reactions and Olefin Formation in Cracking, Hydroconversion, and Coking of Petroleum and Bitumen Fractions", Energy & Fuels, 16, 756-766(2002).

International Search Report and Written Opinion for related PCT application PCT/US2019/055801 dated Jan. 24, 2020. (SA5950PCT).

J.G. Speight, "Visbreaking: A technology of the past and the future", Scientia Iranica, vol. 19, Issue 3, Jun. 2012, pp. 569-573.

Speight, "Handbook of Industrial Hydrocarbon Processes", Elsevier, 2011, Chapter 11, ISBN 978-0-7506-8632-7, pp. 395-406.

Heinz Zimmermann and Roland Walzl, "Ethylene", Ullmann Encyclopedia of Industrial Chemistry, Wiley-VCH Verlag, 2012, vol. 13, p. 465.

(56) References Cited

OTHER PUBLICATIONS

Kniel, et al., "Ethylene; Keystone to the Petrochemical Industry", Marcel Dekker, New York(NY), 1980, pp. 62-72. ISBN 0-8247-6914-7.
Kouzu et al., "Catalytic potential of carbon-supported Ni—Mo-sulfide for ultra-deep hydrodesulfurization of diesel fuel", Applied Catalysis A: General 265 (2004) 61-67.
M. Te et al., "Oxidation reactivities of dibenzothiophenes in polyoxometalate/H2O2 and formic acid/H2O2 systems," Applied Catalysis A: General 219 (2001), p. 267-280.
Jinli Zhang et. al., "The effect of supercritical water on coal pyrolysis and hydrogen production: A combined ReaxFF and DFT study", Fuel, 108, 682-690 (2013).
McCall, T.F., Technology Status Report—Coal Liquefaction, Cleaner Coal Technology Programme, XP-002663181, Department of Trade of Industry of the United Kingdom, Oct. 31, 1999, pp. 1-14, from Internet (attached PCT Int'l Search Report dated Nov. 23, 2011).
Messing et al., "Ceramic Powder Synthesis by Spray Pyrolysis", Journal of the American Ceramic Society, vol. 76, No. 11, pp. 2707-2726 (1993).
Min, "A Unique Way to Make Ultra Low Sulfur Diesel", Korean Journal of Chemical Engineering, vol. 19, No. 4, (2002) pp. 601-606, XP008084152.
Mizushima et al., "Preparation of Silica-supported Nickel Catalyst by Fume Pyrolysis: Effects of Preparation Conditions of Precursory Solution on Porosity and Nickel Dispersion", Journal of the Japan Petroleum Institute, vol. 48, No. 2, pp. 90-96(2005).
Mochida et al., "Adsorption and Adsorbed Species of SO2 during its Oxidative Removal over Pitch-Based Activated Carbon Fibers", Energy & Fuels, vol. 13, No. 2, 1999, pp. 369-373.
Mochida et al., "Kinetic study of the continuous removal of Sox on polyacrylonitrile-based activated carbon fibers", Fuel, vol. 76, No. 6 (1997), pp. 533-536.
Mochida et al., "Removal of Sox and Nox over activated carbon fibers", Carbon, vol. 38 (2000), pp. 227-239.
Murata et al., "A Novel Oxidative Desulfurization System for Diesel Fuels with Molecular Oxygen in the Presence of Cobalt Catalysts and Aldehydes", Energy & Fuels, vol. 18, No. 1 (2004), pp. 116-121.
Okamoto et al., "A study on the preparation of supported metal oxide catalysts using JRC-reference catalysts. I Preparation of a molybdena-alumina catalyst. Part 1. Surface area of alumina", Applied Catalysis A: General 170 (1998), pp. 315-328.
Okuyama et al., "Preparation of nanoparticles via spray route", Chemical Engineering Science, vol. 58, pp. 537-547 (2003).
Old et al., "ConocoPhillips S ZorbTM Sulfur Removal Technology: A Proven Solution to the ULSG Challenge", ERTC 9th Annual Meeting, Prague, pp. 1-16, ERTC 9th Annual Meeting, Refining & Petrochemical, Apr. 27-29, 2005, Kuala Lumpur Malaysia.
Otsuki et al., "Oxidative Desulfurization of Light Gas Oil and Vacuum Gas oil by Oxidation and Solvent Extraction", Energy & Fuels, vol. 14, No. 6 (2000), pp. 1232-1239.
Parker, R.J. and Simpson, P.L., Liquefaction of Black Thunder Coal with Counterflow Reactor Technology, XP-002663163, Ninth Pittsburgh Coal Conference, Oct. 31, 1992, pp. 1191-1195, from Internet (see attached PCT Int'l Search Report dated Nov. 23, 2011).
Pawelec et al., "Carbon-supported tungsten and nickel catalysts for hydrodesulfurization and hydrogenation reactions", Applied Catalysis A: General 206 (2001) 295-307.
PCT International Search Report and Written Opinion dated Mar. 30, 2012, International Application No. PCT/US2012/021163, International Filing Date Jan. 13, 2012.
PCT International Search Report dated Nov. 21, 2011, International Application No. PCT/US2011/051192, International Filing Date: Sep. 12, 2011.
PCT International Search Report dated Nov. 23, 2011, International Application No. PCT/US2011/051183, International Filing Date: Sep. 12, 2011.
PCT/US2018/022301 International Search Report and Written Opinion dated May 22, 2018; 14 pgs.
Perry's Chemical Engineers' Handbook, Eighth Ed., 2008, McGraw-Hill, pp. 10-24-10-27.
Pinero et al., "Temperature programmed desorption study on the mechanism of SO2 oxidation by activated carbon and activated carbon fibers", Carbon, vol. 39 (2001), pp. 231-242.
Robinson, P.R. and Kraus, L.S., Thermochemistry of Coking in Hydroprocessing Units: Modeling Competitive Naphthalene Saturation and Condensation Reactions, XP-002663070, Apr. 26, 2006, from Internet (see attached PCT Int'l Search Report dated Nov. 21, 2011).
Sampanthar et al., "A novel oxidative desulfurization process to remove refractory sulfur compounds from diesel fuel", Applied Catalysis B: Environmental 63 (2006), pp. 85-93.
Sano et al., "Adsorptive removal of sulfur and nitrogen species from a straight run gas oil over activated carbons for its deep hydrodesulfurization", Applied Catalysis B: Environmental (2004), vol. 49, pp. 219-225.
Sano et al., "Effects of nitrogen and refractory sulfur species removal on the deep HDS of gas oil", Applied Catalysis B: Environmental (2004), vol. 53, pp. 169-174.
Sano et al., "Selection and Further Activation of Activated Carbons for Removal of Nitrogen Species in Gas Oil as a Pre-Treatment for Deep Desulfurization" American Chemical Society, Fuel Chemistry Division Preprints (2003), vol. 48(2), pp. 658-659.
Sano et al., "Two-step adsorption process for deep desulfurization of diesel oil", Fuel (2005), pp. 903-910, vol. 84, Elsevier Ltd.

* cited by examiner

INTEGRATED HYDROTHERMAL PROCESS TO UPGRADE HEAVY OIL

RELATED APPLICATIONS

This application is a continuation application of U.S. patent application Ser. No. 15/914,667 filed on Mar. 7, 2018, which is related and claims priority to U.S. Pat. App. No. 62/468,721 filed on Mar. 8, 2017. For purposes of United States patent practice, this application incorporates the contents of the provisional application by reference in its entirety.

TECHNICAL FIELD

Disclosed are methods for upgrading petroleum. Specifically, disclosed are methods and systems for upgrading petroleum using an integrated hydrothermal process.

BACKGROUND

Supercritical water has many advantages when used to upgrade heavy oil. The extent of upgrading in supercritical water processes is limited by the amount of hydrogen and the instability of catalysts in supercritical water.

The high temperature in the supercritical water reactor induces thermal cracking of chemical bonds such as carbon-sulfur bonds and carbon-carbon bonds. Broken bonds are filled with other atoms or by forming unsaturated bonds. Preferably the broken bonds are filled with hydrogen to avoid intermolecular condensation and generation of olefins and aromatics. While olefins are valuable chemicals, low stability of unsaturated bonds can degrade products by forming gums. Although hydrogen from the water molecule can participate in cracking reactions, the extent of hydrogen donation from water is limited in supercritical water condition due to high hydrogen-oxygen bond energy. Products from a supercritical water process can have higher aromaticity and olefinicity than the feed petroleum, which has a negative effect on the economic value of the products.

The harsh conditions in a supercritical water process results in unstable catalysts. Disintegration of heterogeneous catalysts is frequently observed in supercritical water. Homogeneous catalysts, such as organometallic compounds, can be transformed to inactive form under supercritical water condition. However, hydrogen abstraction from water can be benefited from in the presence of catalyst in supercritical water.

SUMMARY

Disclosed are methods for upgrading petroleum. Specifically, disclosed are methods and systems for upgrading petroleum using an integrated hydrothermal process.

In a first aspect, an integrated hydrothermal process for upgrading heavy oil is provided. The integrated hydrothermal process includes the steps of mixing a heated water stream and a heated feed in a mixer to produce a mixed fluid, where the heated water stream is supercritical water and the heated feed is at a feedstock temperature less than 300 degrees Celsius (deg C.) and a feedstock pressure greater than the critical pressure of water, introducing the mixed stream to a reactor unit to produce a reactor effluent, allowing conversion reaction to occur in the reactor unit is maintained at a temperature greater than the critical temperature of water and at a pressure greater than the critical pressure of water, wherein the conversion reactions are operable to upgrade the hydrocarbons in the mixed fluid such that the reactor effluent includes light fractions, heavy fractions, and water. The integrated hydrothermal process further including the steps of cooling the reactor effluent in a cooling device to produce a cooled fluid at a temperature less than the critical temperature of water and less than the temperature of the reactor effluent, depressurizing the cooled fluid in a depressurizing device to produce a depressurized fluid at a pressure less than the steam pressure corresponding to the temperature of the cooled fluid such that water in the depressurized fluid is present as steam, introducing the depressurized fluid to a flash drum, separating the depressurized fluid in the flash drum to produce a light fraction stream and a heavy fraction stream. The light fraction stream includes the light fractions and water and the heavy fraction stream includes the heavy fractions and water, where the heavy fraction stream includes a water content between 0.1 percent by weight (wt %) and 10 wt %. The integrated hydrothermal process further includes introducing the heavy fraction stream to an aqueous reforming unit, and allowing upgrading reactions to occur in the aqueous reforming unit to produce an aqueous reforming outlet. The aqueous reforming unit includes a catalyst operable to catalyze upgrading reactions in the presence of steam. The aqueous reforming outlet includes a greater concentration of light fraction relative the petroleum feed.

In further aspects, the integrated hydrothermal process includes the steps of reducing the temperature of the light fraction stream in a lights cooling device to produce a cooled light fraction at a temperature of 50 deg C., introducing the cooled light fraction to a lights separation zone, separating the cooled light fraction in the lights separation zone to produce a gas product, a petroleum product, and a water product. In further aspects, the integrated hydrothermal process includes the steps of introducing the petroleum product to a hydrogenation unit to produce a hydrogenated product. In further aspects, the integrated hydrothermal process includes the steps of separating a slip stream from the gas product, introducing the slip stream to a gas sweetening unit, removing an amount of hydrogen sulfide from the slip stream to produce a sweetened gas stream, and introducing the sweetened gas stream to the aqueous reforming unit. In further aspects, the integrated hydrothermal process includes the steps of mixing the aqueous reforming outlet and the light fraction stream in a product mixer to produce a mixed fraction, reducing the temperature of the mixed fraction in a lights cooling device to produce a cooled mixed fraction at a temperature of 50 deg C., introducing the cooled mixed fraction to a lights separation zone; separating the cooled mixed fraction in the lights separation zone to produce a gas phase product, a petroleum phase product, and a water phase stream. In further aspects, the integrated hydrothermal process includes the steps of increasing a pressure of a petroleum feed in a feed pump to produce a pressurized feed, where the pressure of the pressurized feed is greater than the critical pressure of water, increasing a temperature of the pressurized feed in a feed heater to produce the heated feed at the feedstock temperature, increasing a pressure of a water stream in a water pump to create a pressurized water at a pressure greater than the critical pressure of water; and increasing a temperature of the pressurized water in a water heater to produce the heated water stream, where the heated water is at a water temperature. In further aspects, the petroleum feed is selected from the group consisting of whole range crude oil, reduced crude oil, atmospheric distillates, atmospheric residue streams, vacuum distillates, vacuum residue streams, cracked product streams, such as light cycle oil and coker gas, decanted oil, C10+ oil and other streams from an ethylene plant, liquefied coal, and biomaterial-derived hydrocarbons. In further aspects, the catalyst is selected from the group consisting of a homogeneous catalyst and a heterogeneous catalyst. In further aspects, the catalyst is a heterogeneous catalyst that includes an active species, a promoter, and a support material. In further aspects, the heterogeneous catalyst is a 2 wt % Ni-5 wt % Mg catalyst supported on silicon dioxide. In further aspects, the catalyst is a homogeneous catalyst that includes an active species and a ligand. In further aspects, the integrated hydrothermal process includes the steps of dispersing the catalyst in a dispersal fluid to produce a catalyst feed, where dispersal of the catalyst in the dispersal fluid is achieved using ultrasonic waves; injecting the catalyst feed at an injection rate into the flash drum such that the injection rate maintains a weight ratio of hydrocarbons to catalyst in the range between 0.05 and 0.07, such that the catalyst mixes with the heavy fraction to produce a heavy stream; and introducing the heavy stream to the aqueous reforming unit. In further aspects, a ratio of a volumetric flow rate of water to a volumetric flow rate of a petroleum feed at standard ambient temperature and pressure is between 1:10 and 10:1.

In a second aspect, an integrated hydrothermal system for upgrading heavy oil is provided. The integrated hydrothermal system includes a mixer configured to mix a heated water stream and a heated feed to produce a mixed fluid, where the heated water stream is supercritical water, where the heated feed is at a feedstock temperature less than 300 deg C. and a pressure greater than the critical pressure of water, a reactor unit fluidly connected to the mixer, the reactor unit configured to maintain a temperature greater than the critical temperature of water, and further configured to maintain a pressure greater than the critical pressure of water such that conversion reactions occur in the reactor unit, the conversion reactions are operable to upgrade the hydrocarbons in the mixed fluid such that a reactor effluent includes light fractions, heavy fractions, and water, a cooling device fluidly connected to the reactor unit, the cooling device configured to reduce the temperature of the reactor effluent to produce a cooled fluid at a temperature greater than the critical temperature of water and less than the temperature of the reactor effluent, a depressurizing device fluidly connected to the cooling device, the depressurizing device configured to reduce the pressure of the cooled fluid to produce a depressurized fluid at a pressure less than the steam pressure corresponding to the temperature of the cooled fluid such that water in the depressurized fluid is present as steam, a flash drum fluidly connected to the depressurizing device, the flash drum configured to separate the depressurized fluid into a light fraction stream and a heavy fraction stream, where the light fraction stream includes the light fractions and water, where the heavy fraction stream includes the heavy fractions and water, where the heavy fraction stream includes a water content between 0.1 wt % and 10 wt %, and an aqueous reforming unit fluidly connected to the flash drum, the aqueous reforming unit configured to upgrade the heavy fraction stream to produce an aqueous reforming outlet. The aqueous reforming unit includes a catalyst, where the catalyst is operable to catalyze upgrading reactions in the presence of steam.

In other aspects, the integrated hydrothermal system further includes a lights cooling device fluidly connected to the flash drum, the lights cooling device configured to reduce the temperature of the light fraction stream to produce a cooled light fraction at a temperature of 50 deg C., a lights separation zone, the lights separation zone configured to separate the cooled light fraction into a gas product, a petroleum product, and a water product. In other aspects, the integrated hydrothermal system further includes a hydrogenation unit fluidly connected to the lights separation zone, the hydrogenation unit configured to produce a hydrogenated product. In other aspects, the integrated hydrothermal system further includes a gas sweetening unit fluidly connected to the lights separation zone, the gas sweetening unit configured to remove a portion of hydrogen sulfide from a slip stream of the gas product to produce a sweetened gas stream. In other aspects, the integrated hydrothermal system further includes a product mixer fluidly connected to the aqueous reforming unit, the product mixer configured to mix the aqueous reforming outlet and the light fraction stream to produce a mixed fraction, a lights cooling device fluidly connected to the product mixer, the lights cooling device configured to reduce the temperature of the mixed fraction to produce a cooled mixed fraction at a temperature of 50 deg C., a gas-liquid separator fluidly connected to the lights cooling device, the gas-liquid separator configured to separate the cooled mixed fraction into a gas phase product and a liquid phase product, and an oil-water separator fluidly connected to the gas-liquid separator, the oil-water separator configured to produce a petroleum phase product and a water phase stream.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

Figure 1:
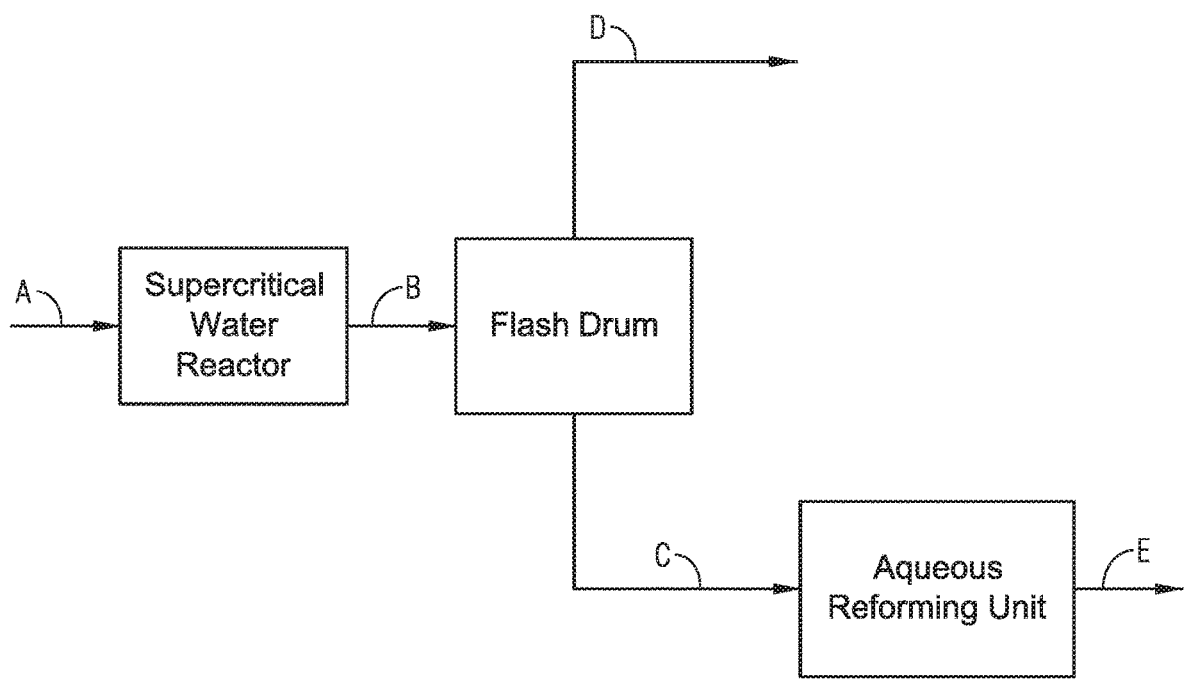
FIG. 1 provides a simplified process diagram of the process.

While the scope will be described with several embodiments, it is understood that one of ordinary skill in the relevant art will appreciate that many examples, variations and alterations to the apparatus and methods described here are within the scope and spirit. Accordingly, the embodiments described are set forth without any loss of generality, and without imposing limitations, on the embodiments. Those of skill in the art understand that the scope includes all possible combinations and uses of particular features described in the specification.

Described here are processes and systems of an integrated hydrothermal process. An integrated hydrothermal process can combine a supercritical water process and a subcritical water process. Advantageously, the addition of the subcritical water process provides an integrated system through which the unconverted hydrocarbons from the supercritical water process can be converted. An integrated hydrothermal process improves energy efficiency while minimizing complexity of the system. Advantageously, the milder conditions of the subcritical water process as compared to the supercritical water process allow a catalyst to be used in the subcritical water process.

As used throughout, "external supply of hydrogen" refers to hydrogen, in gas ($H_2$) or liquid form, supplied as a feed or part of a feed to a unit in the system. External supply of hydrogen does not encompass hydrogen present in the petroleum feedstock.

As used throughout, "external supply of catalyst" refers to a catalyst added to a unit as either a part of the feed to the unit or present in the empty unit, for example as a catalyst bed. External supply of catalyst does not encompass compounds that could have a catalytic effect and are part of the petroleum feedstock or produced through reactions within the units of the system.

As used throughout, "in the absence of" means does not contain, does not include, does not comprise, is without, or does not occur.

As used throughout, "heavy fraction" refers to the fraction in a hydrocarbon fluid having a True Boiling Point 10 percent (TBP 10%) that is greater than 650 degrees Fahrenheit (deg F.) (343 deg C.), and alternately greater than 1050 deg F. (566 deg C.). The heavy fraction can include components from a petroleum feed that were not converted in the supercritical water reactor. The heavy fraction can also include hydrocarbons that were dimerized or oligomerized in the supercritical water reactor.

As used throughout, "light fraction" refers to the fraction that remains of a hydrocarbon fluid after the heavy fraction is removed. TBP 90% of the light fraction is less than 650 deg F. and alternately less than 1050 deg F.

The boiling point ranges of the light fraction and the heavy fraction can depend on the target properties of the products, such as the concentration of unsaturated hydrocarbons in the product or the viscosity. For example, if the light fraction can be a valuable product even when it contains amounts of unsaturated hydrocarbons, then the heavy fraction can have a TBP 10% greater than 1050 deg F. so as to reduce the load on the aqueous reforming unit. For example, if the light fraction is to be used as a low viscosity fuel oil, the heavy fraction can have a TBP 10% greater than 650 deg F.

As used throughout, "trim" refers to the adjustment of temperature of a fluid within a vessel by an amount in the range from 10% less to 10% greater than the temperature of the fluid. By way of an example, a fluid at 450 deg C. can be trimmed to 410 deg C.

As used throughout, "homogeneous catalyst" refers to catalysts which are dissolved in fluid at ambient conditions. Homogeneous catalysts can change their solubility in a fluid by decomposition which can give catalytic activity to the catalyst.

As used throughout, "sweeten" or sweetening" refers to the removal of a portion of hydrogen sulfide from a gas stream.

As used throughout, "coke" refers to the toluene insoluble material present in petroleum.

As used throughout, "maltene phase" or "maltene fraction" refers to the n-heptane solution fraction of hydrocarbons.

As used throughout, "upgrade" means to increase the API gravity, decrease the amount of impurities, such as sulfur, nitrogen, and metals, decrease the amount of asphaltene and increase the amount of the light fraction.

It is known in the art that hydrocarbon reactions in supercritical water upgrade heavy oil to produce products that have lighter fractions. Supercritical water has unique properties making it suitable for use as a petroleum reaction medium where the reaction objectives include upgrading reactions, desulfurization reactions and demetallization reactions, where supercritical water acts as both a hydrogen source and a solvent (diluent). Supercritical water is water greater than the critical temperature of water and greater than the critical pressure of water. The critical temperature of water is 373.946 deg C. The critical pressure of water is 22.06 megapascals (MPa). Without being bound to a particular theory, it is understood that the basic reaction mechanism of supercritical water mediated petroleum processes is the same as a radical reaction mechanism. Thermal energy creates radicals through chemical bond breakage. Supercritical water, acting as a diluent, creates a "cage effect" by surrounding radicals. The radicals surrounded by water molecules cannot react easily with each other, and thus, intermolecular reactions that contribute to coke formation are suppressed. The cage effect suppresses coke formation by limiting inter-radical reactions compared to conventional thermal cracking processes, such as delayed coker. Hydrogen from the water molecules can be transferred to the hydrocarbons through direct transfer or through indirect transfer, such as the water gas shift reaction. While, supercritical water facilitates hydrogen transfer between molecules, it is inevitable to produce unsaturated hydrocarbons due to the limited amount of available hydrogen. Unsaturated carbon-carbon bonds can be distributed through the whole range of boiling points. Olefins, as a representative unsaturated hydrocarbon, are valuable chemicals, but low stability can cause many problems such as gum formation when exposed to air. Thus, it is common practice in modern refinery to saturate olefins with hydrogen in the presence of catalyst. Thermal cracking of a paraffin feed can produce paraffins and olefins having reduced numbers of carbons compared to the paraffin feed. The relative amount of paraffins and olefins and the distribution of carbon numbers strongly depends on the phase where the thermal cracking occurs. In the liquid phase, faster hydrogen transfer between molecules occurs due to the high density creating closer distances between the molecules which makes hydrogen transfer between molecules easier and faster. In the gas phase, methane, ethane, and other light paraffin gases are produced and consumer large amounts of hydrogen. Thus, the liquid phase facilitates the formation of more paraffins in the liquid phase product as compared to gas-phase cracking. Additionally, liquid phase cracking shows generally even distribution of the carbon numbers of the product while gas phase cracking has more light paraffins and olefins in the product.

Referring to FIG. 1, a general process flow diagram of the process for conversion of heavy oil is provided. Stream A includes a mix of petroleum and water. Stream A is fed to a supercritical water process, such as a supercritical water reactor, where conversion reactions occur at or greater than the supercritical conditions of water. The product from the supercritical water reactor, Stream B, includes a light fraction, a heavy fraction, and water. Stream B is introduced to a flash drum at a pressure less than the pressure in the supercritical water reactor. The flash drum produces Stream C and Stream D. Stream D contains the light fraction and water. Stream D can be subjected to further treatments, such as an alkali treatment as described in U.S. Pat. No. 9,005,432. The hydrocarbons in the light fraction can be considered upgraded and can be in the absence of further treatment processes.

Stream C is a mixture of the heavy fraction and water from Stream B. Stream C is introduced to a subcritical water process, such as an aqueous reforming unit. The integrated hydrothermal process is advantageous because the amount of water used in the supercritical water process can be used in the subcritical water process. In the aqueous reforming unit, steam reforming occurs in the presence of a catalyst. The steam reforming reaction generates hydrogen, which is transferred to the hydrocarbons that are contained in the heavy fraction. Upgrading reactions can occur in the aqueous reforming unit. The integrated hydrothermal process creates a treated feed for the aqueous reforming unit from the supercritical water reactor. The heavy fraction from the supercritical water reactor can contain a high amount of unsaturated bonds due to the breaking of bonds. Advantageously, the high amount of unsaturated bonds enables the heat of the hydrogenation reaction in the aqueous reforming unit to maintain the temperature in the aqueous reforming unit. In contrast, when an untreated feed is fed to an aqueous reforming unit bond breaking occurs before the unsaturated compounds are hydrogenated from hydrogen. It is understood that "unstable" bonds, such as in olefins, are preferred in an aqueous reforming unit, with hydrogen generation and hydrogenation reactions.

Stream E contains upgraded hydrocarbons relative to Stream C. The order of processing, supercritical water reactor and then an aqueous reforming unit, is the order necessary for producing Stream E. Supercritical water can crack the heavy molecules in the absence of forming coke due to the cage effect. An aqueous reforming unit generates hydrogen and hydrogenation of unsaturated bonds. In the order of the integrated hydrothermal process, the supercritical water reactor cracks heavy molecules and the aqueous reforming unit hydrogenates the unsaturated bonds on the cracked molecules, producing a product with lighter unsaturated bonds. In a reversed process, where aqueous reforming occurs upstream of a supercritical water reactor, the final product would contain a greater fraction of unsaturated bonds. Asphalthene is concentrated in the heaviest fractions of crude oil, such as vacuum residue. The specific gravity of vacuum residue is higher than water at normal conditions, which means that the asphalthene fraction can settle in the water. Likewise, in a steam environment, the heavy fraction tends to precipitate by gravity force unless intensive mixing occurs. Thus, in an aqueous reforming reactor, asphalthene can settle away from the steam causing solid coke formation. Formation of solid coke means reduced liquid and gas yields. Supercritical water can have a high solubility toward hydrocarbons. Additionally, supercritical water is believed to swell aggregates of hydrocarbons, such as asphalthene. Advantageously, in the integrated hydrothermal process, some of the asphalthene can stay in the swollen state, which is beneficial to the aqueous reforming reactor. Advantageously, the supercritical water reactor can supply energy to the reactor effluent which can be carried through to the heavy fraction stream and can provide the energy for the aqueous reforming unit. Advantageously, the operating conditions in the aqueous reforming unit suppress the formation of coke.

Advantageously, aqueous reforming utilizes optimized process severities, the intensity of which can be measured by the P-value of the oil. P-value is a titrative technique that measures oil's asphaltenes tendency to precipitate. Precipitation of the asphaltenes is the first step in coking reactions. The P-value has a direct relation to asphaltenes content as well as paraffin content of the oil. Oil with greater amounts of asphaltenes, but less paraffin content is more stable than oil with less asphaltenes content, but greater amounts of paraffins. For example, the P-values of Arabian light atmospheric residue is 0.85 and for vacuum residue is 2.9. The minimum P-value for oil stability is 1.15. As oil is subjected to cracking, the P-value of the oil is reduced due to the generation of additional paraffins, paraffins tend to reduce the solvation power of oil towards asphaltenes. In at least one embodiment, the P-value of the petroleum feed is in the range of 1.3 and 3.5.

Figure 2:
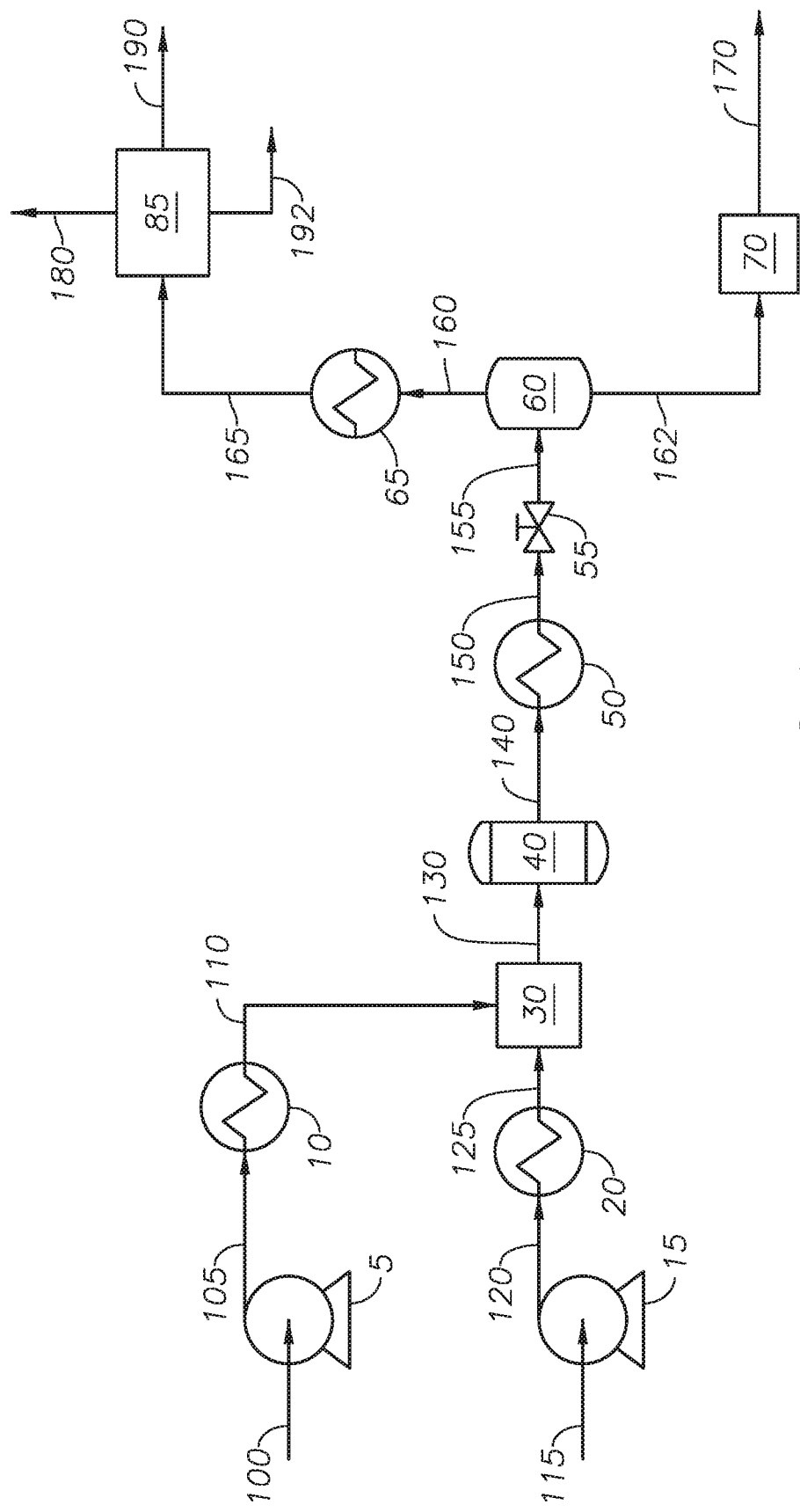
FIG. 2 provides a process diagram of one embodiment of an integrated hydrothermal process.

Referring to FIG. 2, an integrated hydrothermal process for the conversion of heavy oil is provided and described with reference to an integrated hydrothermal system. Petroleum feed 115 is transferred to feed heater 20 through feed pump 15. Pressurized feed 120 can be any source of petroleum-based hydrocarbons, including heavy oil. Examples of petroleum-based hydrocarbon sources include whole range crude oil, reduced crude oil, atmospheric distillates, atmospheric residue streams, vacuum distillates, vacuum residue streams, cracked product streams, such as light cycle oil and coker gas, decanted oil, oil containing hydrocarbons with 10 or more carbons (C10+ oil) and other streams from an ethylene plant, liquefied coal, and biomaterial-derived hydrocarbons. The petroleum-based hydrocarbon source can be an individual stream from a refinery and combined streams from a refinery. The petroleum-based hydrocarbon source can come from an upstream operation, such as a produced oil stream. An example of a bio-derived material includes bio fuel oil. In at least one embodiment, petroleum feed 115 is whole range crude oil. In at least one embodiment, petroleum feed 115 is an atmospheric residue stream. In at least one embodiment, petroleum feed 115 is a vacuum residue stream. Atmospheric residue and vacuum residue streams are bottom streams or bottom fractions from an atmospheric distillation process or vacuum distillation process.

Feed pump 15 increases the pressure of petroleum feed 115 to produce pressurized feed 120. Feed pump 15 can be any type of pump capable of increasing the pressure of petroleum feed 115. Examples of feed pump 15 include a diaphragm metering pump. Pressurized feed 120 has a feedstock pressure. The feedstock pressure of pressurized feed 120 is at a pressure greater than the critical pressure of water, alternately greater than about 23 MPa, and alternately between about 23 MPa and about 30 MPa. In at least one embodiment, the feedstock pressure is about 24 MPa.

Feed heater 20 increases the temperature of pressurized feed 120 to produce heated feed 125. Feed heater 20 can be any type of heating device that can increase the temperature of pressurized feed 120. Examples of feed heater 20 can include a gas-fired heater and a heat exchanger. Feed heater 20 heats pressurized feed 120 to a feedstock temperature. The feedstock temperature of heated feed 125 is at temperature equal to or less than 350 deg C., alternately a temperature less than 300 deg C., alternately a temperature between about 30 deg. C. and 300 deg C., alternately a temperature less than 150 deg C., alternately a temperature between 30 deg. C. and 150 deg C., and alternately a temperature between 50 deg. C. and 150 deg C. In at least one embodiment, the feedstock temperature is 150 deg C. Keeping the temperature of heated feed 125 less than 350 deg C. reduces, and in some cases eliminates the production of coke in the step of heating the feedstock upstream of the reactor. In at least one embodiment, maintaining the feedstock temperature of heated feed 125 at or less than about 150 deg C. eliminates the production of coke in heated feed 125. Additionally, heating a petroleum-based hydrocarbon stream to 350 deg C., while possible, requires heavy heating equipment, whereas heating to 150 deg C. can be accomplished using steam in a heat exchanger. Heating pressurized feed 120 to produce heated feed 125 prevents the formation of hot spots in the reactor that would be due to the reactor having to rapidly heat mixed fluid 130, as the temperature of heated feed 125 contributes to and maintains at a higher temperature, the temperature of mixed fluid 130.

Water stream 100 is fed to water pump 5 to create pressurized water 105. In at least one embodiment, water stream 100 is demineralized water with a conductivity less than 1.0 micro Siemens per centimeter ($\mu$S/cm$^2$) and alternately a conductivity less than 0.1 $\mu$S/cm$^2$. Water pump 5 can be any type of pump capable of increasing the pressure of water feed 100. Examples of pumps suitable for use as water pump 4 include a diaphragm metering pump. Pressurized water 105 has a water pressure. The water pressure of pressurized water 105 is a pressure greater than the critical pressure of water, alternately a pressure greater than about 23 MPa, and alternately a pressure between about 23 MPa and about 30 MPa. In at least one embodiment, the water pressure is about 24 MPa. Pressurized water 105 is fed to water heater 10 to create heated water stream 110.

Water heater 10 heats pressurized water 105 to a water temperature to produce heated water stream 110. Water heater 10 can be any type of heating device that can increase the temperature of pressurized water 105. Examples of water heater 10 can include a gas-fired heater, and a heat exchanger. The water temperature of pressurized water 105 is a temperature greater than the critical temperature of water, alternately a temperature greater than 380 deg C., alternately a temperature between about 374 deg C. and about 600 deg C., alternately between about 374 deg C. and about 450 deg C., and alternately greater than about 450 deg C. Heated water stream 110 is supercritical water. The upper limit of the water temperature is constrained by the rating of the physical aspects of the process, such as pipes, flanges, and other connection pieces. For example, for 316 stainless steel, the maximum temperature at high pressure is recommended to be 649 deg C. Temperatures less than 600 deg C. are practical within the physical constraints of the pipelines. In at least one embodiment, heated water stream 110 is greater than 380 deg C. Heated water stream 110 is supercritical water at conditions greater than the critical temperature of water and critical pressure of water.

Water stream 100 and petroleum feed 115 are pressurized and heated separately. In at least one embodiment, the temperature difference between heated feed 125 and heated water stream 110 is greater than 300 deg C. Without being bound to a particular theory, a temperature difference between heated feed 125 and heated water stream 110 of greater than 300 deg C. is believed to increase the mixing of the petroleum-based hydrocarbons present in heated feed 125 with the supercritical water in heated water stream 110 in mixer 30. Heated water stream 110 is in the absence of an oxidizing agent. Regardless of the order of mixing, petroleum feedstock 115 is not heated greater than 350 deg C. until after having been mixed with water stream 110 to avoid the production of coke.

Heated water stream 110 and heated feed 125 are fed to mixer 30 to produce mixed fluid 130. Mixer 30 can include any mixer capable of mixing a petroleum-based hydrocarbon stream and a supercritical water stream. Examples of mixers for mixer 30 include static mixers, tee fittings, ultrasonic mixers, and capillary mixers. Without being bound to a particular theory, supercritical water and hydrocarbons do not instantaneously mix on contact, but require sustained mixing before a well-mixed or thoroughly mixed stream can be developed. A well-mixed stream facilitates the cage-effect of the supercritical water on the hydrocarbons. Mixed fluid 130 is introduced to reactor unit 40. The ratio of the volumetric flow rates of petroleum feed to water entering reactor unit 40 at standard ambient temperature and pressure (SATP) is between about 1:10 and about 10:1, and alternately between about 1:5 and 5:1. In at least one embodiment, the ratio of the volumetric flow rate of water to the volumetric flow rate of petroleum feedstock entering reactor unit 40 is in the range of 1:1 to 5:1.

Having a well-mixed mixed fluid 130 can increase the conversion of hydrocarbons in the reactor. The temperature of mixed fluid 130 depends on the water temperature of heated water stream 110, the feedstock temperature of heated feed 125, and the ratio of heated water stream 110 to heated feed 125. The temperature of mixed fluid 130 can be between 270 deg C. and 500 deg C., alternately between 300 deg. C. and 500 deg C., and alternately between 300 deg C. and 374 deg C. In at least one embodiment, the temperature of mixed fluid 130 is greater than 300 deg C. The pressure of mixed fluid 130 depends on the water pressure of heated water stream 110 and the feedstock pressure of heated feed 125. The pressure of mixed fluid 130 can be greater than 22 MPa.

Mixed fluid 130 is introduced to reactor unit 40 to produce reactor effluent 140. In at least one embodiment, mixed stream 130 passes from mixer 30 to reactor unit 40 in the absence of an additional heating step. In at least embodiment, mixed stream 130 passes from mixer 30 to reactor unit 40 in the absence of an additional heating step, but through piping with thermal insulation to maintain the temperature.

Reactor unit 40 is operated at a temperature greater than the critical temperature of water, alternately between about 374 deg C. and about 500 deg C., alternately between about 380 deg C. and about 480 deg C., alternately between about 390 deg C. and about 450 deg C., alternately between about 400 deg C. and about 500 deg C., alternately between about 400 deg C. and about 430 deg C., and alternately between 420 deg C. and about 450 deg C. In at least one embodiment, the temperature in reactor unit 40 is between 400 deg C. and about 460 deg C. Reactor unit 40 is at a pressure greater than the critical pressure of water, alternately greater than about 22 MPa, alternately between about 23 MPa and 35 MPa, and alternately between about 24 MPa and about 30 MPa. The residence time of mixed fluid 130 in reactor unit 40 is greater than about 10 seconds, alternately between about 10 seconds and about 5 minutes, alternately between about 10 seconds and 10 minutes, alternately between about 1 minute and about 6 hours, and alternately between about 10 minutes and 2 hours. Conversion reactions can occur in reactor unit 40. Exemplary conversion reactions include cracking, isomerization, alkylation, dimerization, aromatization, cyclization, desulfurization, denitrogenation, demetallization, and combinations thereof. Reactor effluent 140 can include heavy fractions, light fractions, and water.

Reactor effluent 140 is fed to cooling device 50 to produce cooled fluid 150. Cooling device 50 can be any device capable of reducing the temperature of reactor effluent 140. In at least one embodiment, cooling device 50 is a heat exchanger. Cooled fluid 150 is at a temperature at or greater than the critical temperature of water. In at least one embodiment, cooled fluid 150 is at a temperature less than the critical temperature of water. In at least one embodiment, the process for upgrading petroleum is in the absence of cooling device 50. Cooling device 50 can be designed to trim the fluid temperature. The temperature of cooling device 50 facilitates flashing of depressurized fluid 155 in flash drum 60 without the need for further heating.

Cooled fluid 150 passes through depressurizing device 55 to produce depressurized fluid 155. Depressurizing device 55 can be any pressure regulating device capable of reducing fluid pressure. Examples of pressure regulating devices that can be used as depressurizing device 55 include pressure control valves, capillary elements, and back pressure regulators. In at least one embodiment, depressurizing device 55 can be a back pressure regulator. Depressurizing device 55 reduces the pressure of cooled fluid 150 to a pressure less than the steam pressure for the temperature of depressurized fluid 155. As an example, at a temperature of 350 deg C., steam is produced at a pressure less than 16.259 MPa; as a result, the pressure of depressurized fluid 155 should be less than 16.259 MPa at 350 deg C. The amount of hydrogen in depressurized fluid 155 is less than 1 wt % of the hydrocarbons in depressurized fluid 155.

In at least one embodiment, the process is in the absence of cooling device 50 and depressurizing device 55 is designed in consideration of a reduction in temperature due to expansion of the fluid through depressurizing device 55.

For clarity, the water in the integrated hydrothermal system is liquid from the water pump to the water heater, the water in the system is at supercritical conditions from the water heater to the depressurizing device, and is steam from the depressurizing device to the flash drum.

Depressurized fluid 155 is fed to flash drum 60. Flash drum 60 separates depressurized fluid 155 into light fraction stream 160 and heavy fraction stream 162. Flash drum 60 can be a simple fractionator, such as a flash drum. Advantageously, the temperature and pressure of depressurized fluid 155 are such that a flash drum can be used to separate depressurized fluid 155 into the light fractions and the heavy fractions. Flash drum 60 can be designed to generate vapor inside. Light fraction stream 160 includes light fractions and water. Heavy fraction stream 162 includes heavy fractions and water. The composition, including the petroleum composition and the amount of water, of each of light fraction stream 160 and heavy fraction stream 162 depends on the temperature and pressure in flash drum 60. The temperature and pressure of flash drum 60 can be adjusted to achieve the desired separation between light fraction stream 160 and heavy fraction stream 162. In at least one embodiment, the temperature and pressure of flash drum 60 can be controlled to achieve a water content in heavy fraction stream 162 of greater than 0.1 percent by weight (wt %), alternately between 0.1 wt % and 10 wt %, alternately between 0.1 wt % and 1 wt %, and alternately between 1 wt % and 6 wt %. The unconverted fractions from petroleum feed 115 are in heavy fraction stream 162. Flash drum 60 can include an external heating element (not shown) to increase the temperature of the internal fluid. The external heating element can be any type known in the art capable of maintaining or increasing the temperature in a vessel. Flash drum 60 can include an internal heating element (not shown) to increase the temperature of the internal fluid. Flash drum 60 can include an internal mixing device. The internal mixing device can by any type of internal mixing device known in the art capable of enhancing mixing of the internal fluid. In one embodiment, the internal mixing device is an agitator.

Figure 3:
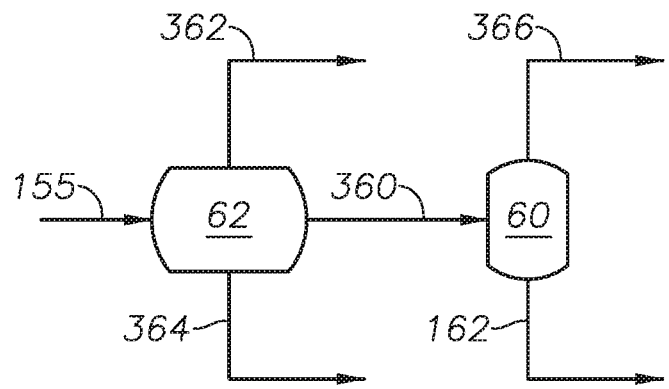
FIG. 3 provides a process diagram of one embodiment of an integrated hydrothermal process.

In an alternate embodiment, as shown with reference to FIG. 3, depressurized fluid 155 can be fed to phase separator 62 and separated into gas stream 362, oil stream 360, and spent water stream 364. Oil stream 360 can be fed to flash drum 60 to be separated into light stream 366 and heavy fraction stream 162. Spent water stream 364 can be treated and fed to the aqueous reforming unit. Treatment of spent water 364 can include filtering steps and deionizing steps. Light stream 366 can be treated as described with reference to light fraction stream 160 and FIG. 2. The embodiment of FIG. 3, combining phase separator 62 and flash drum 60 can be used when the total dissolved solids in the water fraction exiting reactor unit 40 is greater than 100 parts-per-million by weight (wt ppm). A total dissolved solids of greater than 100 wt ppm can contaminate the heavy fraction from the flash drum in the absence of a three-phase oil water separator to separate the water with dissolved solids. In at least one embodiment, high total dissolved solids in the water fraction exiting reactor unit 40 can be present when the petroleum feedstock contains high inorganic content, such as a salt content higher than 3.4 pounds per thousand, or a nickel and vanadium content higher than 66 wt ppm.

Returning to FIG. 2, light fraction stream 160 is fed to lights cooling device 65 to produce cooled light fraction 165. Lights cooling device 65 can be any type of heat exchanger capable of reducing the temperature of light fraction stream 160. Examples of heat exchangers useful as lights cooling device 65 include shell and tube heat exchanger. The temperature of cooled light fraction 165 can be at or less than 100 deg C., alternately at or less than 75 deg C., and alternately at or less than 50 deg C. In at least one embodiment, the temperature of cooled light fraction 165 is at 50 deg C. In at least one embodiment, light fraction stream 160 can be fed through a pressure regulator. In at least one embodiment, the pressure regulator can reduce the pressure of light fraction stream 160 to ambient pressure.

Figure 3A:
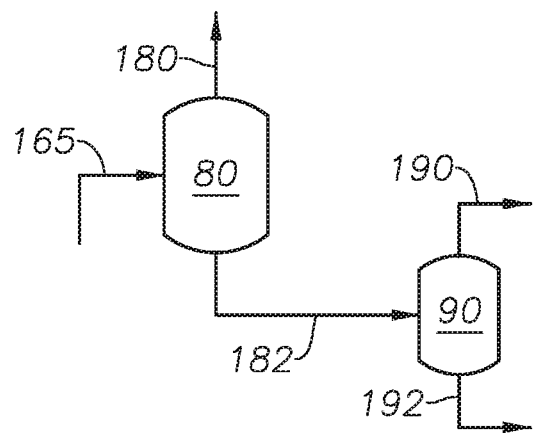
FIG. 3A provides a process diagram of one embodiment of an integrated hydrothermal process.
Figure 3B:
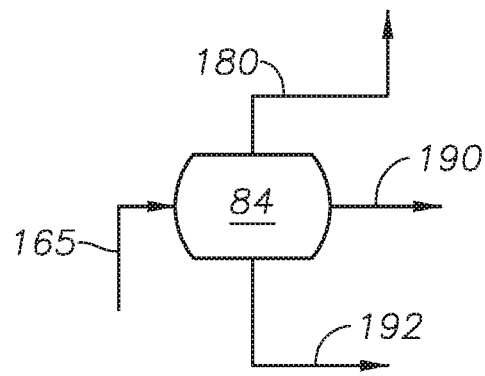
FIG. 3B provides a process diagram of one embodiment of an integrated hydrothermal process.

Cooled light fraction 165 can be introduced to lights separation zone 85. Lights separation zone 85 separates cooled light fraction 165 into gas product 180, petroleum product 190, and water product 192. Lights separation zone 85 can include multiple separation units in series or can include a single three-phase separator. In at least one embodiment, as described with reference to FIG. 3A, lights separation zone 85 includes a gas-liquid separator and an oil-water separator. Cooled light fraction 165 can be introduced to gas-liquid separator 80 which separates cooled light fraction 165 into gas product 180 and liquid product 182. Liquid product 182 can be introduced to oil-water separator 90 which separates liquid product 182 into petroleum product 190 and water product 192. In at least one embodiment, as described with reference to FIG. 3B, lights separation zone 85 can include a three-phase separator. Cooled light fraction 165 can be introduced to three-phase separator 84. Three-phase separator 84 can be any type of separation unit capable of separating a stream into a gas phase component, a water component, and an oil component. Three-phase separator 84 separates cooled light fraction 165 to produce gas product 180, petroleum product 190, and water product 192.

Returning to FIG. 2, the operating conditions in lights separation zone 85 can be designed to target a composition in petroleum product 190. The temperature in lights separation zone 85 can be less than 100 deg C. The pressure in lights separation zone 85 can be less than 5 MPa. In at least one embodiment, the temperature in lights separation zone 85 can be 50 deg C. In at least one embodiment, the pressure in lights separation zone 85 can be 0.2 MPa. Gas product 180 can include hydrocarbons present as gases, such as methane and ethane, and can include inorganic gases such as carbon monoxide, carbon dioxide, hydrogen sulfide, and hydrogen. Gas product 180 can be released to atmosphere, further processed, or collected for storage or disposal. Water product 192 can be recycled for use as water stream 100, can be further processed, such as in a demineralization process, to remove any impurities and then recycled for use as water stream 100, or can be collected for storage or disposal. Petroleum product 190 can include converted hydrocarbons, such as olefins and aromatics. Petroleum product 190 can include naphtha (hydrocarbons with an final boiling point (FBP) of 204 deg C.), distillates (hydrocarbons with a boiling point range of 204 deg C. to 455 deg C.), vacuum gas oil (VGO) (hydrocarbons with a boiling point range of 455 to 540 deg C.), and unconverted oil (hydrocarbons with a boiling point range of greater than 540 deg C.). In at least one embodiment, the hydrocarbons in petroleum product 190 are lighter, such that the hydrocarbons contain fewer carbon atoms, than the hydrocarbons in petroleum feed 115 and aqueous reforming outlet 170. In at least one embodiment, petroleum product 190 can have improved API gravity, viscosity reduction, and reduced sulfur as compared to petroleum feed 115.

Heavy fraction stream 162 is introduced to aqueous reforming unit 70 to produce aqueous reforming outlet 170. Aqueous reforming unit 70 is a steam reforming unit. The operating conditions in aqueous reforming unit 70 are such that water is present as steam. Aqueous reforming unit 70 is in the absence of liquid water.

Aqueous reforming unit 70 includes one or more reactors. Examples of reactors that can be used as an aqueous reforming unit include vessel type reactors, tubular type reactors, and combinations of vessel type and tubular type reactors. Vessel type reactors can include an internal mixing device, such as an agitator. Tubular type reactors can have a ratio of length to inner diameter of greater than 10, alternately greater than 30. Advantageously, introducing heavy fraction stream 162 to aqueous reforming unit 70 in the absence of light fraction stream 160 reduces the size of aqueous reforming unit 70, avoids introducing olefins to aqueous reforming unit 70 because the olefins are in light fraction stream 160, and provides added stability to aqueous reforming unit 70 because asphaltenes are more stable in the absence of the light fraction.

The temperature in aqueous reforming unit 70 is greater than 300 deg C., alternately greater than 350 deg C., and alternately between 350 deg C. and 460 deg C. In at least one embodiment, the temperature in aqueous reforming unit 70 is 435 deg C. The pressure in aqueous reforming unit 70 is between atmospheric pressure and the water saturation pressure at the temperature such that the water is present as steam or superheated steam. For example, when the temperature in aqueous reforming unit 70 is 435 deg C. the pressure is greater than atmospheric pressure and less than the critical pressure of water. The residence time of the internal fluid in aqueous reforming unit 70 is at least 8 minutes, and alternately at least 12 minutes. In at least one embodiment, the residence time in aqueous reforming unit 70 is at least 12 minutes. Aqueous reforming outlet 170 contains a greater concentration of the light fraction relative to petroleum feed 115. Aqueous reforming outlet 170 is less viscous relative to petroleum feed 115. In at least one embodiment, due to detachment of alkyl appendages and partial conversion of the maltene phase, the amount of asphaltene in aqueous reforming outlet 170 is greater than in petroleum feed 115.

Aqueous reforming unit 70 combines the effects of temperature, pressure, residence time and catalyst. In aqueous reforming unit 70, upgrading reactions can occur in the presence of a catalyst. In at least one embodiment, hydrogen can be generated in aqueous reforming unit 70. In at least one embodiment, aqueous reforming unit 70 is in the absence of an external supply of hydrogen. In aqueous reforming unit 70, hydrogen can be generated and upgrading reactions can occur in the presence of catalyst. Examples of upgrading reactions include reforming reactions, saturation reactions, hydrocarbon cracking reactions, dehydrocyclization reactions, suppressing condensation reactions, demetallization reactions, mono-aromatization reactions, and combinations of the same. The following reforming reactions can occur in aqueous reforming unit 70

$$C_nH_{2n+2} + H_2O \rightleftharpoons CO + 3H_2 \qquad \text{reaction 1}$$

$$C_nH_{2n+1}OH + H_2O \rightleftharpoons CO + 3H_2 \qquad \text{reaction 2}$$

Saturation reactions can include hydrogenation reactions. In at least one embodiment, the catalyst in aqueous reforming unit 70 can catalyze the upgrading reactions. Advantageously, reforming reactions are favored by high temperatures.

The catalyst in aqueous reforming unit 70 does not deactivate in the presence of steam. The catalyst can be a heterogeneous catalyst or a homogeneous catalyst. In at least one embodiment, the catalyst is in the absence of a combination of heterogeneous catalyst and homogeneous catalyst, because in combination a homogeneous catalyst can plug or poison a heterogeneous catalyst.

Heterogeneous catalysts can include active species, promoters, support materials, and combinations of the same. Examples of active species include active species selected from group VII and group VIII transition metals, alkaline metals, alkaline earth metals, and combinations of the same. In at least one embodiment, the catalyst is in the absence of group IV transition metals. Examples of promoters can include promoters selected from boron and phosphorous. Examples of support materials can include support materials selected from alumina, silica, titania, zirconia, activated carbon, carbon black, and metal oxides. The heterogeneous catalyst arrangement can include a fixed bed, a trickle bed, a honeycomb type, and a slurry bed. For a fixed bed or a trickle bed arrangement, the catalyst is in the form of an extrudate having a size that is less than one-tenth of the reactor inner diameter and a bed density that maintains a pressure drop through the bed that is less than 10% of the operating pressure of aqueous reforming unit 70. For a honeycomb type arrangement, the active species are doped on a ceramic honeycomb, such as an alumina and silica-based ceramic, or a metal honeycomb, such as stainless steel or high nickel alloy metal, where the opening on the honeycomb is sized to maintain a pressure drop through the bed that is less than 10% of the operating pressure of aqueous reforming unit 70.

In at least one embodiment, the heterogeneous catalyst can be introduced in a slurry bed arrangement by mixing the heterogeneous catalyst with a dispersal fluid to produce a catalyst feed. In at least one embodiment, the catalyst can be a dissolved homogeneous catalyst that can act as a kind of precursor for active catalyst particles. In at least one embodiment, the dissolved homogeneous catalyst can change to oxide or another solid compound when being subjected to a high temperature by decomposition. The homogeneous catalyst can include active species selected from transition metals, alkali metals, and alkali earth metals. Ligands can be attached to the active species to improve the solubility of the homogeneous catalyst in oil. The homogeneous catalyst can be dispersed a dispersal fluid to produce a catalyst feed.

The catalyst feed can be introduced at any point between flash drum 60 and aqueous reforming unit 70 that can induce turbulence, such as rigorous mixing, of heavy fraction stream 162 containing the catalyst. Advantageously, adding the catalyst upstream of aqueous reforming unit 70 can maximize dispersion of the catalyst particles in heavy fraction stream 162 and can reduce settling, or agglomeration, of catalytic particles.

In at least one embodiment, the catalyst feed can be injected into the flash drum, as described with reference FIG. 4. Catalyst feed 166 can be injected into flash drum 60. Catalyst feed 166 can include a catalyst dispersed in a dispersal fluid. The dispersal fluid can include hydrocarbons having a viscosity less than 650 centistokes (cSt) at 122 deg F. (50 deg C.), water, or a combination of hydrocarbons and water. The catalyst can be a heterogeneous catalyst or a homogeneous catalyst. The catalyst can be dispersed in the dispersal fluid according to known methods of mixing a solid and a liquid. In at least one embodiment, the catalyst can be dispersed in the dispersal fluid using ultrasonic waves for at least two hours prior to injection as catalyst feed 166. Catalyst feed 166 can be injected directly into the flash drum, for example, through a port in flash drum 60. Alternately, catalyst feed 166 can be mixed with depressurized fluid 155 as shown in FIG. 4A and introduced into the flash drum in that way. The catalyst is carried out of the flash drum in heavy stream 462 along with the heavy fractions and water. The flash drum 60 can include means for rigorous mixing. In at least one embodiment, the integrated hydrothermal process can include means for inducing turbulence such that the induced turbulence increases mixing downstream of flash drum 60. Catalyst feed 166 can be injected at an injection rate that can maintain a weight ratio of catalyst to hydrocarbons in heavy stream 462 in the range of 0.05 to 0.07.

In at least one embodiment, the catalyst feed 166 can include a Ni (2 wt %)-Mg (5 wt %) supported on silicon dioxide catalyst. The Ni—Mg catalyst can be prepared by a conventional impregnation method using nickel nitrate and magnesium nitrate as precursors. The dried catalyst can be calcined at 450 deg C. for 6 hours under air before being used in the aqueous reforming unit 70. The silicon dioxide support can be fumed silica having a particle size of 7 nanometers.

Returning to FIG. 2, the amount of water present in heavy fraction stream 162 is the desired amount of water for the upgrading reactions in aqueous reforming unit 70. The desired amount of water in aqueous reforming unit 70 can be between 1 wt % and 10 wt %, alternately between 5 wt % and 10 wt %, and alternately between 5 wt % and 6 wt %. When the amount of water is less than 1 wt %, the steam reforming reactions in aqueous reforming unit 70 can be limited, reducing the extent of upgrading. When the amount of water is higher than 10 wt %, hydrocarbons will be too diluted by excessive steam, which can limit cracking reactions in the hydrocarbon oil phase. Steam in aqueous reforming unit 70 can improve mass transfer of the reactant media. The boiling point of the hydrocarbons in aqueous reforming unit 70 is greater than the reaction temperature at the reaction pressure; therefore, the upgrading reactions in aqueous reforming unit 70 take place in the liquid phase. Light hydrocarbon gases, such as methane, ethane, and propane, can be produced in aqueous reforming unit 70 and are kinetically stable at the reaction conditions and therefore, do not undergo additional reactions. In at least one embodiment, additional water can be added to aqueous reforming unit 70 (not shown) to achieve the desired amount of water in aqueous reforming unit 70. The additional water can be pressurized and heated to the operating conditions of aqueous reforming unit 70 prior to being introduced to aqueous reforming unit 70.

In at least one embodiment, aqueous reforming unit 70 can include heating elements to increase the temperature of the internal fluid as compared to the temperature of heavy fraction stream 162. The heating elements can be external, such as heaters or heat exchangers. Heavy fraction stream 162 is introduced to aqueous reforming unit 70 in the absence of a separation step to separate the oil and water in heavy fraction stream 162. In the absence of oil-water separation upstream of aqueous reforming unit 70, aqueous reforming unit 70 can operate without the addition of water. Advantageously, the heavy fraction stream can be introduced to the aqueous reforming unit from the flash drum without the need for further treatment or conditioning.

Figure 4:
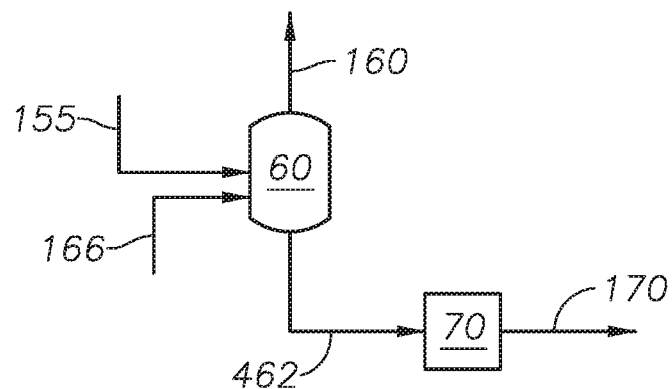
FIG. 4 provides a process diagram of one embodiment of an integrated hydrothermal process.
Figure 5:
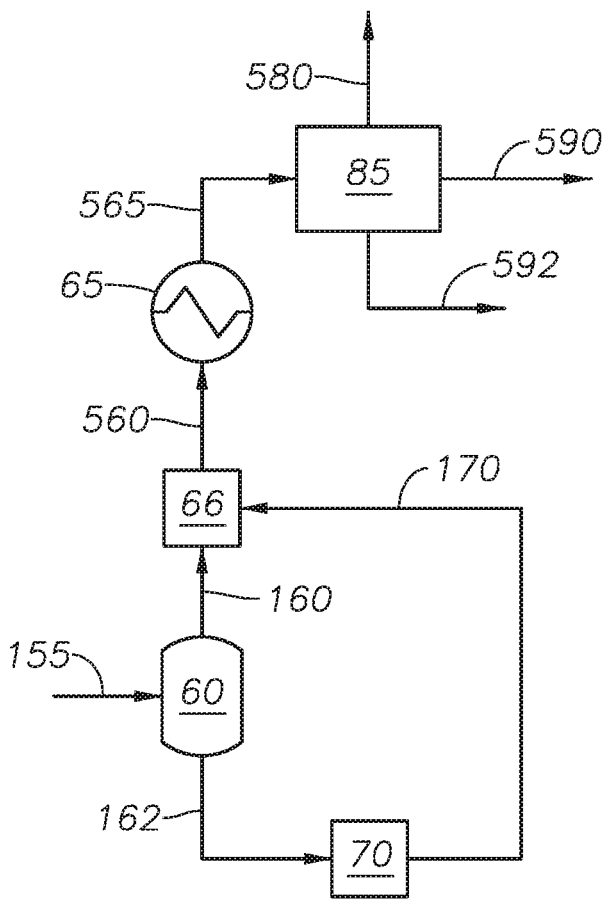
FIG. 5 provides a process diagram of one embodiment of an integrated hydrothermal process.

In an alternate embodiment, as shown in FIG. 5 and described with reference to FIG. 2, aqueous reforming outlet 170 can be mixed with light fraction stream 160 in product mixer 66 to produce mixed fraction 560. In this way, aqueous reforming outlet 170 can be separated into the component, gas, liquid, and water phases in the same equipment that separates light fraction stream 160. This reduces the equipment costs and operating complexity of the process. Mixed fraction 560 can be introduced to lights cooling device 65 to produce cooled mixed fraction 565. Cooled mixed fraction 565 can be at a temperature greater than 50 deg C. Cooled mixed fraction 565 can be introduced to lights separation zone 85 to produce gas phase product 580, petroleum phase product 590, and water phase stream 592. In an embodiment as shown in FIG. 5, where the catalyst has been introduced as a catalyst feed as shown with reference to FIG. 4, the separations in lights separation zone 85 can be designed such that water phase stream 592 includes at least 95% of the catalyst from aqueous reforming unit 70, alternately at least 97% of the catalyst from aqueous reforming unit 70, at least 98% of the catalyst from aqueous reforming unit 70, and alternately at least 99% of the catalyst from aqueous reforming unit 70. Petroleum phase product 590 and water phase stream 592 can be treated to remove the catalyst by a filtering device (not shown). Gas phase product 580, petroleum phase product 590, and water phase stream 592 can be treated as described with reference to gas product 180, petroleum product 190, and water product 192 respectively.

Figure 6:
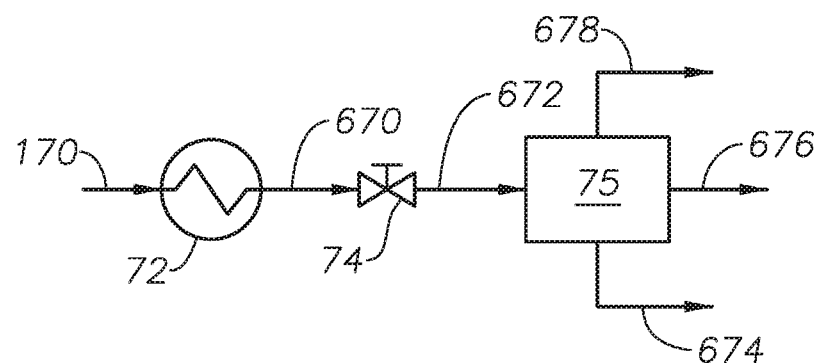
FIG. 6 provides a process diagram of one embodiment of an integrated hydrothermal process.

According to an embodiment, as provided in FIG. 6 with reference to the description of FIG. 2, aqueous reforming outlet 170 can be introduced to reformer cooling device 72 to reduce the temperature of aqueous reforming outlet 170 to less than the boiling point of water for the given pressure. Reformer cooling device 72 can be any type of unit capable of reducing steam to liquid water, such that cooled aqueous outlet 670 contains liquid water. Cooled aqueous outlet 670 is in the absence of steam. Cooled aqueous outlet 670 can be introduced to reformer pressure regulator 74 to produced reformed stream 672. Reformer pressure regulator 74 can be any pressure regulating device capable of reducing the pressure of cooled aqueous outlet 670. In at least one embodiment, reformer pressure regulator 74 can reduce the pressure of cooled aqueous outlet 670 to atmospheric pressure. Reformed stream 672 can be fed to reformer separation zone 75.

Reformer separation zone 75 can be a separation unit capable of separating a stream into its component gas phase, oil phase, and water phase. Examples of separation zone 75 include a single three phase separator and a series of separation vessels. The series of separation vessels can include a vapor-liquid separator and an oil-water separator. Reformer separation zone 7 can separate reformed stream 672 into reformed gas 678, reformed oil 676, and reformed water 674.

Reformed gas 678 can include hydrocarbons present as gases, such as methane, ethane, ethylene, propane, propylene, i-butane, 1-butene, n-butene, i-pentane, carbon dioxide and hydrogen sulfide. Reformed gas 678 can be released to atmosphere, further processed, or collected for storage or disposal. Reformed water 674 can be recycled for use as water stream 100, can be further processed, such as in a demineralization process, to remove any impurities and then recycled for use as water stream 100, or can be collected for storage or disposal. Reformed oil 676 can have a lesser amount of the heavy fraction, reduced asphaltene content, reduced sulfur content, reduced nitrogen content, and reduced metals content as compared to petroleum feed 115. Reformed oil 676 can have a carbon residue (micro), determined from a micro carbon residue test, less than the carbon residue of petroleum feed 115.

Figure 4A:
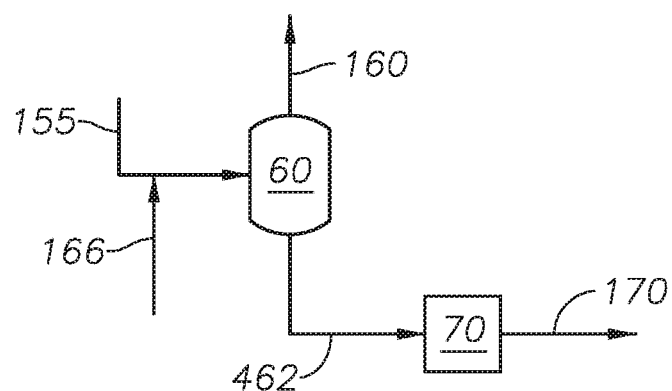
FIG. 4A provides a process diagram of one embodiment of an integrated hydrothermal process.

In embodiments where the catalyst has been introduced as a catalyst feed as shown with reference to FIG. 4, the separation of reformed stream 672 can be designed such that reformed water 674 includes at least 95% of the catalyst from aqueous reforming unit 70, alternately at least 97% of the catalyst from aqueous reforming unit 70, at least 98% of the catalyst from aqueous reforming unit 70, and alternately at least 99% of the catalyst from aqueous reforming unit 70. The remaining catalyst, the catalyst not present in reformed water 674, is present in reformed oil 676. Reformed water 674 and reformed oil 676 can be treated to remove the catalyst present by use of a filtering device (not shown).

Figure 7:
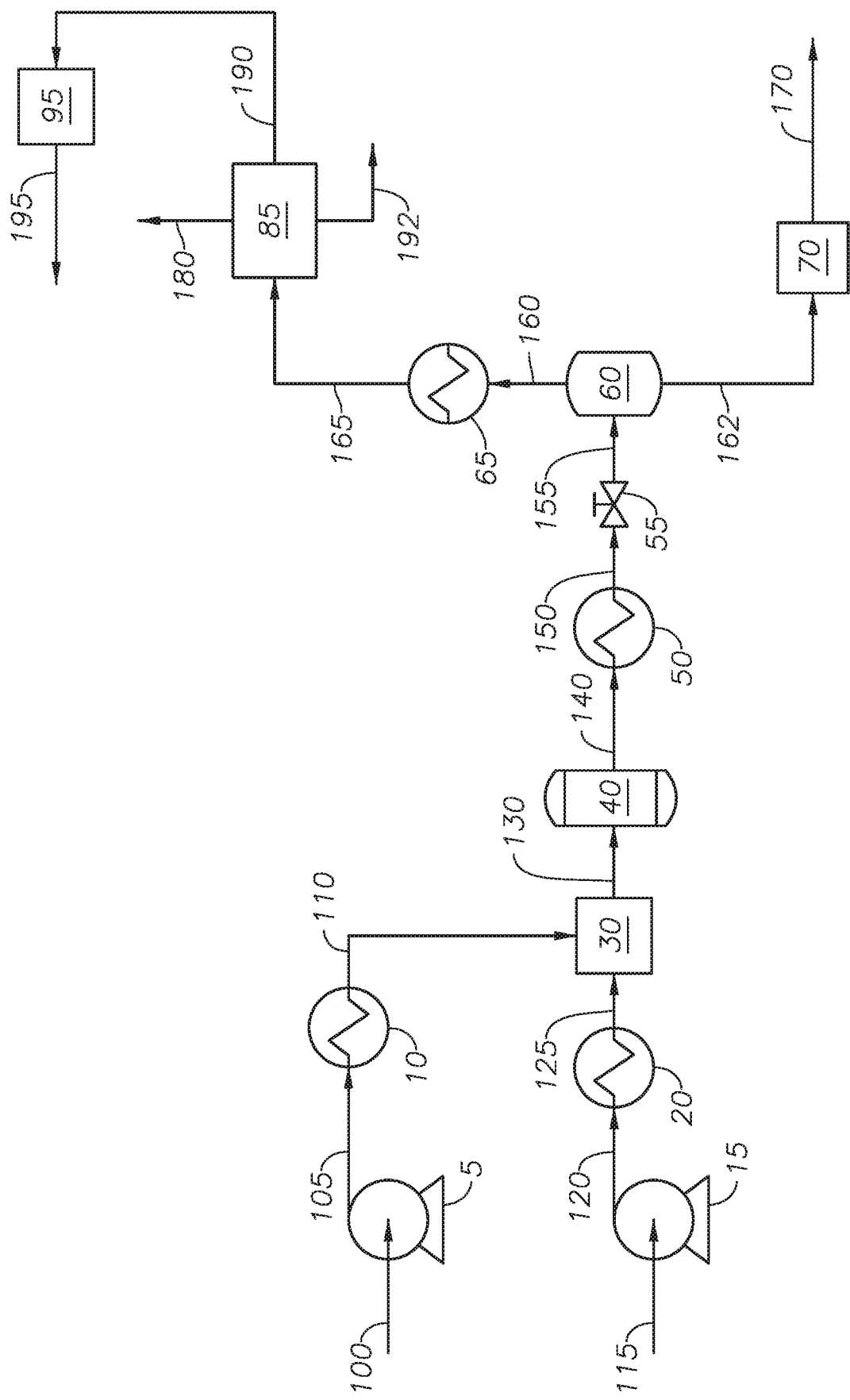
FIG. 7 provides a process diagram of one embodiment of an integrated hydrothermal process.

In an alternate embodiment, as shown in FIG. 7 and described with reference to FIG. 2, petroleum product 190 can be fed to hydrogenation unit 95 to produce hydrogenated product 195. Petroleum product 190 includes light hydrocarbons. Hydrogenation unit 95 can be any commercially available process, including commercially available hydrogenation catalyst.

Figure 8:
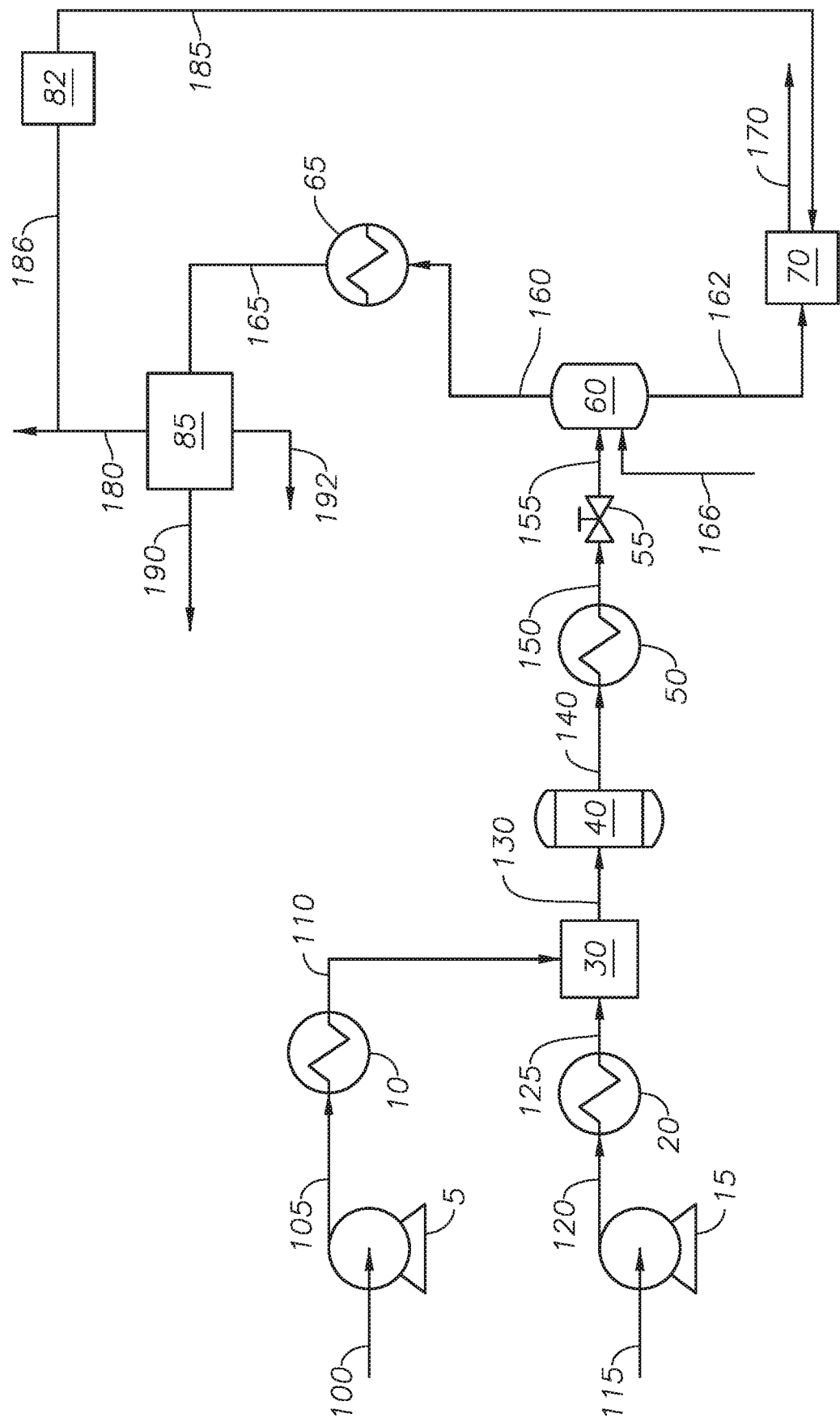
FIG. 8 provides a process diagram of one embodiment of an integrated hydrothermal process.

In an alternate embodiment, as shown in FIG. 8 and described with reference to FIG. 2 and FIG. 3, slip stream 186 from gas product 180 can be separated and fed to gas sweetening unit 82 to produce sweetened gas stream 185. Gas sweetening unit 82 can be any type of unit capable of sweetening a gas phase stream. Examples of sweetening units can include the use of an alkaline solution. Sweetened gas stream 185 can be introduced to aqueous reforming unit 70. Removing hydrogen sulfide from gas product 180 can prevent accumulation of sulfur in aqueous reforming unit 70. In at least one embodiment, sweetened gas stream 185 can be dissolved in a fluid and injected to reactor unit 40. The fluid can include water or oil.

In at least one embodiment, the process to upgrade heavy oil can include both a gas sweetening unit and a hydrogenation unit.

EXAMPLES

Example 1

Figure 9:
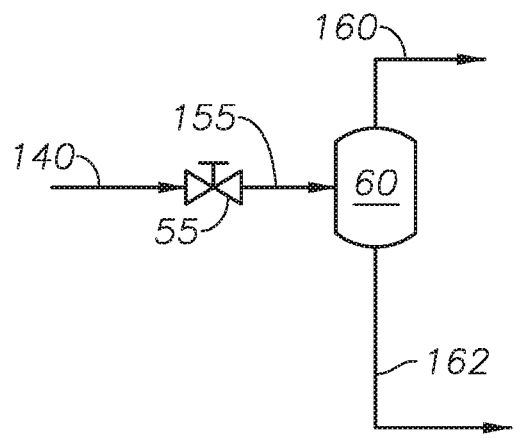
FIG. 9 provides a process diagram of one embodiment of an integrated hydrothermal process.

Example 1 is an Aspen-HYSYS simulation used to simulate the properties of light fraction stream 160 and heavy fraction stream 162 as shown in FIG. 9. Reactor effluent 140 was modeled to have a mass flow rate of hydrocarbons of 100 kilograms per hour (kg/hr) and a mass flow rate of water of 100 kg/hr, for a total mass flow rate of 200 kg/hr. The hydrocarbons in reactor effluent 140 were modeled to have an API gravity of 17.9 degrees. Reactor effluent 140 is depressurized from 3600 psig (24.8 MPa) to 260 psig (1.79 MPa) without a cooling device in depressurizing device 55 to produce depressurized fluid 155. Due to expansion, the temperature of depressurized fluid 155 decreases to 361 deg C. from 440 deg C., the temperature of reactor effluent 140. Depressurized fluid 155 is introduced to flash drum 60, which separates depressurized fluid 155 into light fraction stream 160 and heavy fraction stream 162. Table 1 provides the properties of the streams.

TABLE 1

Stream properties for Example 1.

| | 140 | | 160 | | 162 | |
| --- | --- | --- | --- | --- | --- | --- |
| | Hydro-carbons | Water | Hydro-carbons | Water | Hydro-carbons | Water |
| Mass Flow Rate (kg/h) | 100.0 | 100.0 | 27.0 | 99.8 | 73.0 | 0.3 |
| API Gravity | 17.9 | — | 22.9 | — | 16.0 | — |

Figure 10:
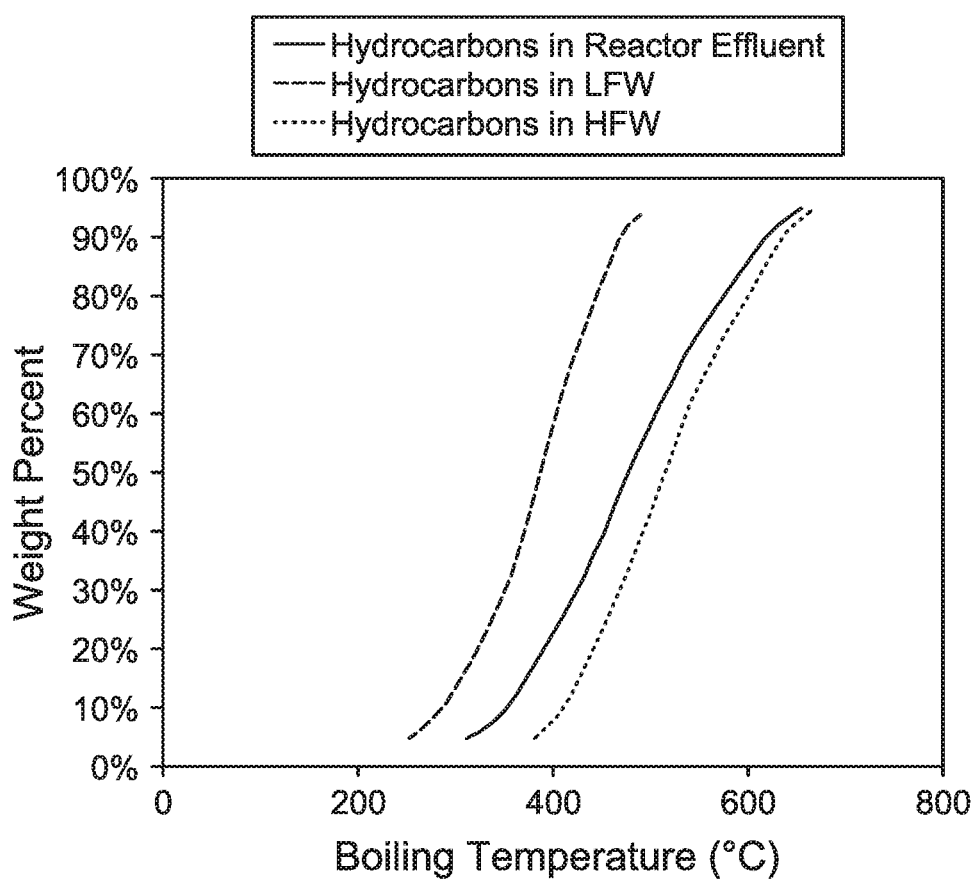
FIG. 10 is a graphical representation of the distillation curves for the hydrocarbons in the reactor effluent, hydrocarbons in the light fraction stream, and hydrocarbons in the heavy fraction stream for Example 1.

As can be seen in Table 1, most of the water is carried in light fraction stream 160, with the water content of heavy fraction stream 162 being 0.27 wt %. The API gravity of hydrocarbons in light fraction stream 160 is higher than that of the hydrocarbons in heavy fraction stream 162. FIG. 10 shows the distillation curve for the hydrocarbons in reactor effluent 140 (hydrocarbons in reactor effluent), light fraction stream 160 (hydrocarbons in LFW), and heavy fraction stream 162 (hydrocarbons in HFW). This example clearly shows that a supercritical reactor unit can generate a good feed for a flash drum and aqueous reforming unit Example 2

Example 2 illustrates the dependence of the composition of light fraction stream 160 and heavy fraction stream 162 on the operating conditions (temperature and pressure) of flash drum 60. An Aspen-HYSYS simulation was used to simulate the properties of light fraction stream 160 and heavy fraction stream 162 as shown in FIG. 9. Reactor effluent 140 was modeled to have a mass flow rate of hydrocarbons of 100 kilograms per hour (kg/hr) and a mass flow rate of water of 100 kg/hr, for a total mass flow rate of 200 kg/hr. The hydrocarbons in reactor effluent 140 were modeled to have an API gravity of 17.9 degrees. Reactor effluent 140 is depressurized from 3600 psig (24.8 MPa) to 260 psig (1.79 MPa) without a cooling device in depressurizing device 55 to produce depressurized fluid 155. Due to expansion, the temperature of depressurized fluid 155 decreases to 361 deg C. from 440 deg C., the temperature of reactor effluent 140. Flash drum 60 was modeled to have a source of heat, such that the temperature in flash drum 60 was increased from 361 deg C. to 400 deg C. Depressurized fluid 155 is introduced to flash drum 60, which separates depressurized fluid 155 into light fraction stream 160 and heavy fraction stream 162. Table 2 provides the properties of the streams.

TABLE 2

Stream properties for Example 2.

| | 140 | | 160 | | 162 | |
|---|---|---|---|---|---|---|
| | Hydro-carbons | Water | Hydro-carbons | Water | Hydro-carbons | Water |
| Mass Flow Rate (kg/h) | 100.0 | 100.0 | 42.5 | 99.9 | 57.5 | 0.1 |
| API Gravity | 17.9 | — | 21.6 | — | 15.1 | — |

Comparing Table 2 to Table 1 of Example 1 shows that the composition of the light fraction and heavy fraction, including the amount of water in each stream depends on the operating conditions in flash drum 60. By increasing the temperature of flash drum 60, as in Example 2, more hydrocarbons can be separated in the light fraction, making the heavy fraction heavier than in Example 1.

Example 3

Figure 11:
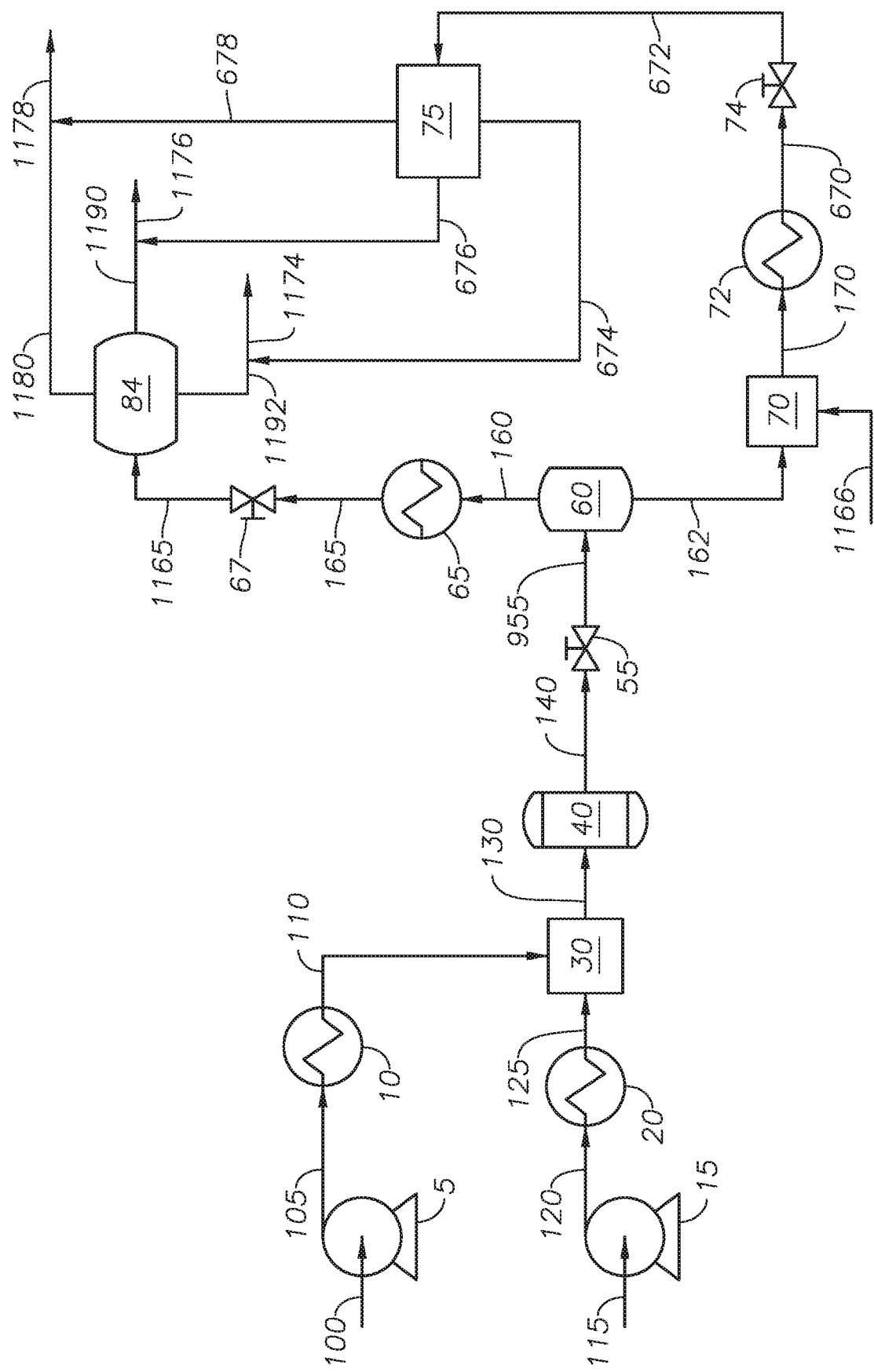
FIG. 11 provides a process diagram of the process of Example 3.

In Example 3, an Aspen-HYSYS process simulation was used to model the integrated hydrothermal process, as shown in FIG. 11. Example 3 was a simulation based on experimental data. Petroleum feed 115 is simulated as an atmospheric residue stream having an API gravity of 12.7 degree, the properties of which are in Table 3. Water stream 100 is simulated as demineralized water having a conductivity less than 0.2 μS/cm². The flow rate of petroleum feed 115 was modeled as 50 L/hr. The flow rate of water stream 100 was modeled as 100 L/hr. The pressure of pressurized water 105 was at a pressure of 3600 psig (24.8 MPa). The pressure of pressurized feed 120 was at a pressure of 3600 psig (24.8 MPa). Water heater 10 increased the temperature of pressurized water 105 to a temperature of 500 deg C. Feed heater 20 increased the temperature of pressurized feed 120 to a temperature of 120 deg C. Mixer 30 was simulated as a simple tee mixer to mix heated water stream 110 and heated feed 135 to produce mixed fluid 130. Mixed fluid 130 is fed to reactor unit 40, which was at a temperature of 450 deg C. Reactor effluent 140 was depressurized to 500 psig (3.45 MPa) in depressurizing device 55 to produce reduced fluid 955. In the simulation, depressurizing device 55 caused cooling of reactor effluent, such that reduced fluid 955 was at a temperature less than the temperature of reactor effluent 140. Reduced fluid 955 was fed to flash drum 60, which is slightly heated to 360 deg C., to compensate for heat loss. Flash drum 60 separated reduced fluid 955 into light fraction stream 160 and heavy fraction stream 162. Light fraction stream 160 is cooled in lights cooling device 65 to a temperature of 50 deg C. and then depressurized in valve 67 to a pressure of 1 psig (6.89 kPa) to produce depressurized lights fraction 1165. Depressurized lights fraction 1165 is then separated into gas phase 1180, oil phase 1190, and water phase 1192 in three-phase separator 84. Heavy fraction stream 162 is fed to aqueous reforming unit 70. According to the stimulation, heavy fraction stream 162 contains 0.55 weight percent water. Make-up water 1166, at a pressure of 500 psig (3447 kPa) and temperature of 360 deg C., is fed to aqueous reforming unit 70 to increase the water content to 4.8 weight percent. Aqueous reforming unit 70 was operated at a temperature of 435 deg C. and a liquid hourly space velocity (LHSV) of 5.3/hr. The simulation included a catalyst of 2 wt % Ni-5 wt % Mg supported on a silicon dioxide composed of fumed silica particles having particle size of 7 nanometers (nm). The catalyst was mixed with make-up water 1166 at a ratio of catalyst to water of 2.5 to 100 by weight. The aqueous reforming unit 70 was exposed to ultrasonic waves for at least two hours to disperse the catalyst. The catalyst injection rate was adjusted to maintain a weight ratio of hydrocarbon to catalyst in the range between 0.05 and 0.07 by weight. Aqueous reforming outlet 170 is cooled to a temperature of 50 deg C. in reformer cooling device 72 and depressurized to a pressure of 1 psig in reformer pressure regulator 74 to produce reformed stream 672. Reformed stream 672 is then separated in reformer separation zone 75 into reformed gas 678, reformed oil 676, and reformed water 674. The separation is made so that the catalyst is primarily in reformed water 674, with less than 1 weight % catalyst in reformed oil 676. Used catalyst can be separated from reformed water 674 or reformed oil 676 by the use of a filtering unit (not shown). Reformed gas 678 is mixed with gas phase 1180 to produce gas stream 1178. Reformed oil 676 is mixed with oil phase 1190 to produce oil stream 1176. Reformed water 674 is mixed with water phase 1192 to produce separated water 1174.

TABLE 3

Properties of Feed and Product Streams

| Properties | | Petroleum Feed 115 | Oil stream 1176 |
|---|---|---|---|
| Mass Flow (kg/hour) | | 49.0 | 46.2 |
| Specific Gravity (Degree) | | 12.7 | 23.2 |
| Distillation (TBP) | 5% | 362 | 258 |
| | 10% | 390 | 301 |
| | 30% | 468 | 378 |
| | 50% | 524 | 420 |
| | 70% | 588 | 468 |
| | 90% | 653 | 541 |
| | 95% | 673 | 571 |
| Total Sulfur Content (wt %) | | 4.0 | 3.4 |
| Viscosity (cSt) at 50 deg C. | | 640 | 27 |
| Asphalthene (Heptane-Insoluble) | | 4.8 | 0.3 |
| Metals (V and Ni) (wtppm) | | 83 | 4 |

Tables 4 and 5 provide details of the mass balance and gas compositions of various streams in the system.

TABLE 4

Mass Balance

| | 115 | 100 | 1166 | 1178 | 1176 | 1174 |
|---|---|---|---|---|---|---|
| Mass Flow (kg/hr) | 49.0 | 99.8 | 1.5 | 3.1 | 46.2 | 101.0 |

TABLE 5

Composition of Gas in Gas Stream 926

| Gas Component | H$_2$O | H$_2$S | H$_2$ | CO | CO$_2$ | C$_1$ | C$_2$ | C$_3$ | C$_4$ |
|---|---|---|---|---|---|---|---|---|---|
| Wt % | 9.1% | 11.1% | 5.5% | 8.4% | 10.7% | 16.7% | 14.0% | 13.1% | 11.3% |

TABLE 6

Properties of Feed and Product Streams

| Properties | | Petroleum Feed 115 | Reactor Effluent 140* |
|---|---|---|---|
| Mass Flow (kg/hour) | | 49.0 | 48.1** |
| Specific Gravity (Degree) | | 12.7 | 19.8 |
| | 5% | 362 | 297 |
| | 10% | 390 | 337 |
| | 30% | 468 | 420 |
| Distillation (TBP) | 50% | 524 | 464 |
| | 70% | 588 | 519 |
| | 90% | 653 | 592 |
| | 95% | 673 | 632 |
| Total Sulfur Content (wt %) | | 4.0 | 3.7 |
| Viscosity (cSt) at 50 deg C. | | 640 | 89 |
| Asphalthene (Heptane-Insoluble) | | 4.8 | 1.7 |
| Metals (V and Ni) (wtppm) | | 83 | 0.2 |

*Properties here are for the liquid hydrocarbons (hydrocarbons with more than 4 carbons) in reactor effluent 140.
**Represents the mass flow of the liquid hydrocarbons, the remaining mass flow is gas.

The results in Tables 3 and 6 show that the product from the integrated hydrothermal process is lighter than the feedstock. The liquid yield from the process was 94 wt % suggesting that 6 wt % of the feed goes into the gas-phase and water phase product.

Although the present embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value and to about another particular value or to about another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

As used throughout this application and in the appended claims, the words "comprise," "has," and "include" and all grammatical variations are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the embodiments.

That which is claimed is:

1. An integrated hydrothermal process for upgrading heavy oil, the integrated hydrothermal process comprising the steps of:

mixing a heated water stream and a heated feed in a mixer to produce a mixed fluid, wherein the heated water stream is supercritical water, wherein the heated feed is at a feedstock temperature less than 300 deg C. and a feedstock pressure greater than the critical pressure of water;

introducing the mixed stream to a reactor unit to produce a reactor effluent;

allowing conversion reactions to occur in the reactor unit, wherein the reactor unit is maintained at a temperature greater than the critical temperature of water and at a pressure greater than the critical pressure of water, wherein the conversion reactions are operable to upgrade the hydrocarbons in the mixed fluid such that the reactor effluent comprises light fractions, heavy fractions, and water;

cooling the reactor effluent in a cooling device to produce a cooled fluid, where the cooled fluid is at a temperature less than the critical temperature of water and less than the temperature of the reactor effluent;

depressurizing the cooled fluid in a depressurizing device to produce a depressurized fluid, where the depressurized fluid is at a pressure less than the steam pressure corresponding to the temperature of the cooled fluid such that water in the depressurized fluid is present as steam;

mixing a catalyst feed with the depressurized fluid, wherein the catalyst feed comprises a catalyst, such that the catalyst is dispersed in the depressurized fluid, such that the weight ratio of hydrocarbons to catalyst in a heavy stream is in the range between 0.05 and 0.07;

introducing the depressurized fluid to a flash drum;

separating the depressurized fluid in the flash drum to produce a light fraction stream and a heavy fraction stream, wherein the light fraction stream comprises the light fractions and water, wherein the heavy fraction stream comprises the heavy fractions and water, wherein the heavy fraction stream comprises a water content between 0.1 wt % and 10 wt %, such that the catalyst mixes with the heavy fraction to produce the heavy stream;

introducing the heavy stream to an aqueous reforming unit; and allowing upgrading reactions to occur in the aqueous reforming unit to produce an aqueous reforming outlet, wherein the catalyst is operable to catalyze the upgrading reactions in the aqueous reforming unit in presence of steam, wherein the aqueous reforming outlet comprises a greater concentration of light fraction relative to the heated feed.

2. The integrated hydrothermal process of claim 1, further comprising the steps of:
reducing the temperature of the light fraction stream in a lights cooling device to produce a cooled light fraction, wherein the cooled light fraction is at a temperature of 50 deg C.;
introducing the cooled light fraction to a lights separation zone; and
separating the cooled light fraction in the lights separation zone to produce a gas product, a petroleum product, and a water product.

3. The integrated hydrothermal process of claim 2, further comprising the step of:
introducing the petroleum product to a hydrogenation unit to produce a hydrogenated product.

4. The integrated hydrothermal process of claim 2, further comprising the steps of:
separating a slip stream from the gas product;
introducing the slip stream to a gas sweetening unit;
removing an amount of hydrogen sulfide from the slip stream to produce a sweetened gas stream; and
introducing the sweetened gas stream to the aqueous reforming unit.

5. The integrated hydrothermal process of claim 1, further comprising the steps of:
mixing the aqueous reforming outlet and the light fraction stream in a product mixer to produce a mixed fraction;
reducing the temperature of the mixed fraction in a lights cooling device to produce a cooled mixed fraction, wherein the cooled mixed fraction is at a temperature of 50 deg C.;
introducing the cooled mixed fraction to a lights separation zone; and
separating the cooled mixed fraction in the lights separation zone to produce a gas phase product, a petroleum phase product, and a water phase stream.

6. The integrated hydrothermal process of claim 1, further comprises the steps of:
increasing a pressure of a petroleum feed in a feed pump to produce a pressurized feed, wherein a pressure of the pressurized feed is greater than the critical pressure of water;
increasing a temperature of the pressurized feed in a feed heater to produce the heated feed, wherein the heated feed is at the feedstock temperature;
increasing a pressure of a water stream in a water pump to create a pressurized water, wherein a pressure of the pressurized water is greater than the critical pressure of water; and
increasing a temperature of the pressurized water in a water heater to produce the heated water stream.

7. The integrated hydrothermal process of claim 6, wherein the petroleum feed is selected from the group consisting of whole range crude oil, reduced crude oil, atmospheric distillates, atmospheric residue streams, vacuum distillates, vacuum residue streams, cracked product streams, decanted oil, C10+ oil, liquefied coal, and biomaterial-derived hydrocarbons.

8. The integrated hydrothermal process of claim 1, wherein the catalyst is selected from the group consisting of a homogeneous catalyst and a heterogeneous catalyst.

9. The integrated hydrothermal process of claim 8, wherein the catalyst is a heterogeneous catalyst that comprises an active species, a promoter, and a support material.

10. The integrated hydrothermal process of claim 9, wherein the heterogeneous catalyst is a 2 wt % Ni-5 wt % Mg catalyst supported on silicon dioxide.

11. The integrated hydrothermal process of claim 8, wherein the catalyst is a homogeneous catalyst that comprises an active species and a ligand.

12. The integrated hydrothermal process of claim 6, wherein a ratio of a volumetric flow rate of the water stream to a volumetric flow rate of the petroleum feed at standard ambient temperature and pressure is between 1:10 and 10:1.

13. An integrated hydrothermal system for upgrading heavy oil, the integrated hydrothermal system comprising:
a mixer, the mixer configured to mix a heated water stream and a heated feed to produce a mixed fluid, wherein the heated water stream is supercritical water, wherein the heated feed is at a feedstock temperature less than 300 deg C. and a pressure greater than the critical pressure of water;
a reactor unit fluidly connected to the mixer, the reactor unit configured to maintain a temperature greater than the critical temperature of water, and further configured to maintain a pressure greater than the critical pressure of water such that conversion reactions occur in the reactor unit, the conversion reactions are operable to upgrade the hydrocarbons in the mixed fluid such that a reactor effluent comprises light fractions, heavy fractions, and water;
a cooling device fluidly connected to the reactor unit, the cooling device configured to reduce the temperature of the reactor effluent to produce a cooled fluid, wherein the cooled fluid is at a temperature less than the critical temperature of water and less than the temperature of the reactor effluent;
a depressurizing device fluidly connected to the cooling device, the depressurizing device configured to reduce the pressure of the cooled fluid to produce a depressurized fluid, where the depressurized fluid is at a pressure less than the steam pressure corresponding to the temperature of the cooled fluid such that water in the depressurized fluid is present as steam;
a catalyst mixer fluidly connected to the depressurizing device, the mixer configured to mix a catalyst feed and the depressurized fluid, wherein the catalyst feed comprises a catalyst such that the catalyst is dispersed in the depressurized fluid at a weight ratio of catalyst to hydrocarbons in a heavy stream in the range of 0.05 to 0.07;
a flash drum fluidly connected to the catalyst mixer, the flash drum configured to separate the depressurized fluid into a light fraction stream and a heavy fraction stream, wherein the light fraction stream comprises the light fractions and water, wherein the heavy fraction stream comprises the heavy fractions and water, wherein the heavy fraction stream comprises a water content between 0.1 wt % and 10 wt %; and
an aqueous reforming unit fluidly connected to the flash drum, the aqueous reforming unit configured to upgrade the heavy fraction stream to produce an aqueous reforming outlet, wherein the aqueous reforming unit comprises a catalyst, wherein the catalyst is operable to catalyze upgrading reactions in the presence of steam, wherein the aqueous reforming outlet comprises a greater concentration of light distillates relative to the petroleum feed.

14. The integrated hydrothermal system of claim 13, further comprising:
a lights cooling device fluidly connected to the flash drum, the lights cooling device configured to reduce the temperature of the light fraction stream to produce a cooled light fraction, wherein the cooled light fraction is at a temperature of 50 deg C.;
a lights separation zone, the lights separation zone configured to separate the cooled light fraction into a gas product, a petroleum product, and
a water product.

15. The integrated hydrothermal system of claim 14, further comprising:
a hydrogenation unit fluidly connected to the lights separation zone, the hydrogenation unit configured to produce a hydrogenated product, wherein the hydrogenated product comprises.

16. The integrated hydrothermal system of claim 14, further comprising:
a gas sweetening unit fluidly connected to the lights separation zone, the gas sweetening unit configured to remove a portion of hydrogen sulfide from a slip stream of the gas product to produce a sweetened gas stream.

17. The integrated hydrothermal system of claim 13, further comprising:
a product mixer fluidly connected to the aqueous reforming unit, the product mixer configured to mix the aqueous reforming outlet and the light fraction stream to produce a mixed fraction;
a lights cooling device fluidly connected to the product mixer, the lights cooling device configured to reduce the temperature of the mixed fraction to produce a cooled mixed fraction, wherein the cooled mixed fraction is at a temperature of 50 deg C.;
a gas-liquid separator fluidly connected to the lights cooling device, the gas-liquid separator configured to separate the cooled mixed fraction into a gas phase product and a liquid phase product; and
an oil-water separator fluidly connected to the gas-liquid separator, the oil-water separator configured to produce a petroleum phase product and a water phase stream.

18. The integrated hydrothermal system of claim 13, wherein the catalyst is selected from the group consisting of a homogeneous catalyst and a heterogeneous catalyst.

19. The integrated hydrothermal system of claim 18, wherein the catalyst is a heterogeneous catalyst that comprises an active species, a promoter, and a support material.

* * * * *